United States Patent
Sangra et al.

(10) Patent No.: US 12,159,171 B2
(45) Date of Patent: *Dec. 3, 2024

(54) EVENT HANDLING BASED ON TRACING EXECUTION PATHS

(71) Applicant: LOGICMONITOR, INC., Santa Barbara, CA (US)

(72) Inventors: Sudhir Sangra, Maharashtra (IN); Amol Parekh, Maharashtra (IN); Manish Galande, Maharashtra (IN)

(73) Assignee: LOGICMONITOR, INC., Santa Barbara, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 17/724,384

(22) Filed: Apr. 19, 2022

(65) Prior Publication Data
US 2023/0342226 A1 Oct. 26, 2023

(51) Int. Cl.
*G06F 9/44* (2018.01)
*G06F 9/54* (2006.01)
*G06F 11/34* (2006.01)
*G06F 9/38* (2018.01)

(52) U.S. Cl.
CPC .......... *G06F 9/542* (2013.01); *G06F 11/3466* (2013.01); *G06F 9/3838* (2013.01)

(58) Field of Classification Search
None
See application file for complete search history.

(56) References Cited

U.S. PATENT DOCUMENTS

| | | | |
|---|---|---|---|
| 8,689,190 B2* | 4/2014 | DeWitt, Jr. | G06F 11/3409 717/127 |
| 2005/0081107 A1* | 4/2005 | DeWitt, Jr. | G06F 11/348 714/E11.2 |
| 2014/0047341 A1* | 2/2014 | Breternitz | G06F 9/5072 715/735 |
| 2019/0012174 A1* | 1/2019 | Grant | G06F 11/3433 |

* cited by examiner

*Primary Examiner* — Qamrun Nahar
(74) *Attorney, Agent, or Firm* — ARENTFOX SCHIFF LLP

(57) ABSTRACT

A computing system may include at least one memory and at least one processor coupled to the at least one memory. The at least one processor may be configured to calculate a trace distribution associated with an execution path of an instruction set. The at least one processor may be further configured to assign a score to the instruction set based on the trace distribution associated with the execution path of the instruction set. The at least one processor may be further configured to control handling of an event associated with an execution of the instruction set based on the score.

18 Claims, 8 Drawing Sheets

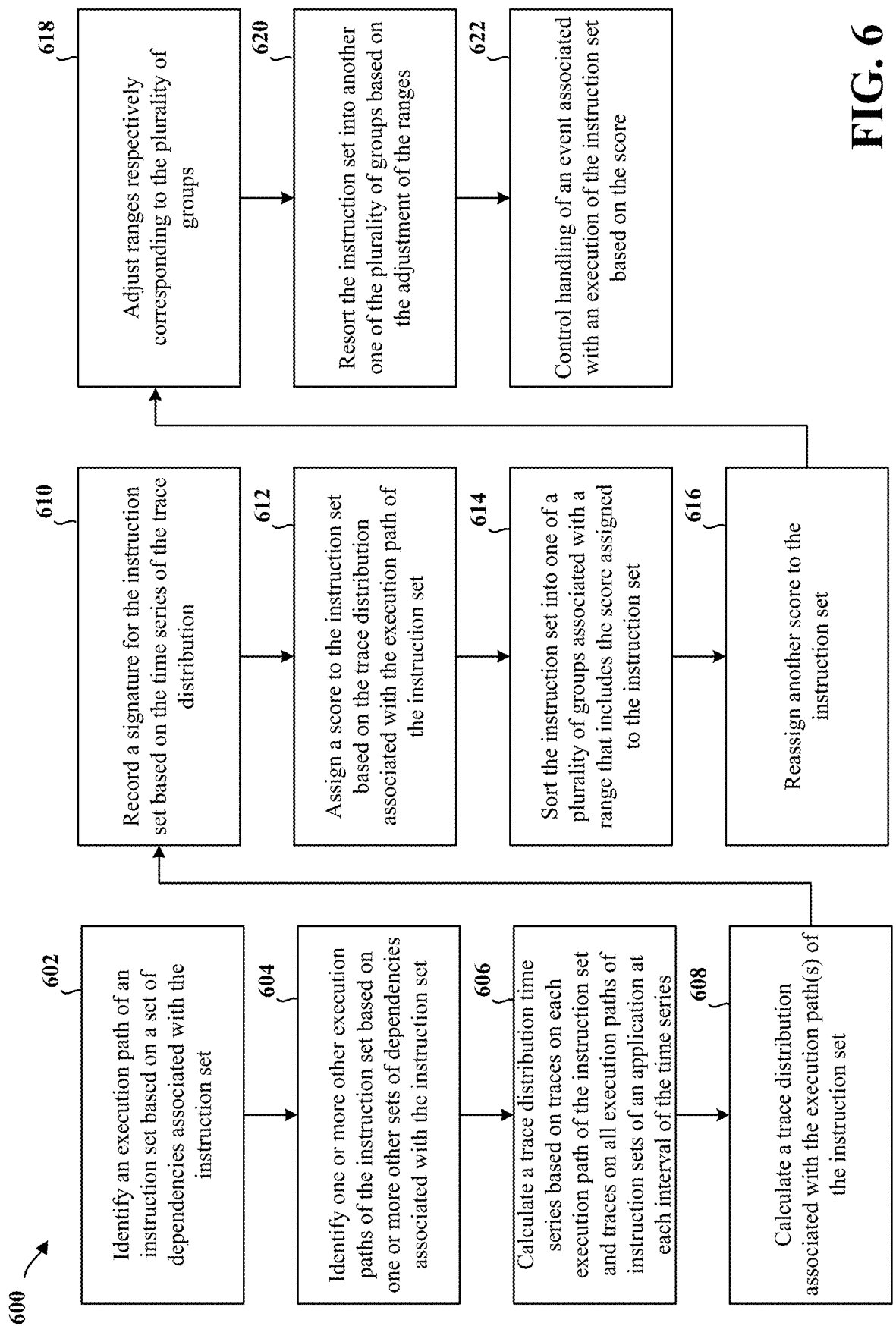

EVENT HANDLING BASED ON TRACING EXECUTION PATHS

BACKGROUND

Technical Field

The present disclosure generally relates to communication systems, and more particularly, to processing and handling of events in a service based architecture using execution paths of services associated with the events.

INTRODUCTION

In the context of computer systems, applications may be described as monolithic where the user interface and logic underlying the functionality are encapsulated in a single container or package via a single platform. Monolithic applications are generally composed of multiple tightly coupled functions, with such functions being implemented using a single software stack.

Application design has and continues to trend away from the monolithic architecture, as developers have increasingly observed the principle of modularity. Modularity promotes the subdivision of application functionality, which may support reuse of such functionality. Modularity can be realized on a single computing device, for example, through separately executable files that are aggregated to achieve an application's use or purpose.

However, the speed of communication over networks has rapidly increased, thereby reducing latency added through accessing remote systems and components. Many networks are now capable of data transmission rates that enable modularity to be extended across distributed systems. Predictably, applications implemented across distributed systems receive significant numbers of messages from the various systems and/or components associated with the application. A mechanism according to which an application in a distributed environment can efficiently and appropriately handle such messages from other systems and components does not exist.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In computing environments having a service-based architecture (SBA), such as a microservices architecture (MSA) or service-oriented architecture (SOA), some overarching functionality may be reliant upon a set of service dependencies. Each service may perform some discrete unit of the overarching functionality. In MSA, for example, the functionality of an application may be realized through multiple microservices that each perform a function, with all of the functions resulting in the application functionality. The microservices, which may also be referred to simply as "services," may be loosely coupled, thereby promoting some MSA design principles such as location transparency, service autonomy, and service abstraction.

As services in SBA may be autonomous and abstracted, categorizing those services in terms of importance, priority, criticality, etc. may be so complex as to be impractical. Such a task is only further complicated by service composability, where one service may rely on another service in a manner that is otherwise opaque to other applications or services, and so the importance or criticality of the other service may not be readily apparent due to service abstraction.

Moreover, this complexity only serves to increase the volume of events (e.g., notifications, errors, exceptions, log entry, etc.) that result during each instance of an application or service. Handling these events in an equivalent may be prohibitively expensive and/or detrimental to the user experience because the incurred overhead may reduce the availability of network and/or computational resources, including storage or buffer space, display space, instruction cycles, and so forth. Consequently, handling every event equally may increase latency-potentially to an intolerable degree that causes timeout, error, or other non-ideal or unexpected application operation—or impede the ability of a user to discern and address events of paramount importance or criticality. Thus, a need exists for an approach to managing the events that are frequently commensurate with an application or service in an SBA system.

The present disclosure provides various techniques and solutions for managing events occurring in SBA systems due to service dependencies. Specifically, the present disclosure describes various techniques and solutions in which respective execution paths are found for each service executed as part of a complete application, as well as the traces of those execution paths over one or more time intervals. A trace distribution may be forecasted for each service based on the execution paths and the traces over those execution paths. Based thereon, a criticality score may be assigned to each of the services, and events originating with the services may be processed or handled according to the assigned criticality scores, e.g., relative to one another and/or in comparison with one or more thresholds.

In so doing, the effects of various services may be reconciled with various rules, policies, roles, and the like, which may be applied to enforce a business context. For example, decisions regarding the processing or handling of events may be made in a manner that reduces or mitigates the effects of some services in favor of robustly and efficiently providing application functionality and/or ensuring some events are appropriately and adequately handled. Such techniques and solutions may decrease latency and/or other overhead, which may improve application performance and user experience.

In one aspect of the disclosure, a computing system having at least one memory and at least one processor coupled to the memory is described. The at least one processor may be configured to calculate a trace distribution associated with an execution path of an instruction set. The at least one processor may be further configured to assign a score to the instruction set based on the trace distribution associated with the execution path of the instruction set. The at least one processor may be further configured to control handling of an event associated with an execution of the instruction set based on the score.

In another aspect of the disclosure, another computing system having at least one memory and at least one processor coupled to the memory is described. The at least one processor may be configured to evaluate a set of traces associated with executions of a plurality of instruction sets. The at least one processor may be further configured to identify a set of execution paths associated with the plurality of instruction sets. The at least one processor may be further configured to determine a criticality factor associated with each of the plurality of instruction sets based on a trace distribution forecasted from the set of traces and the set of execution paths. The at least one processor may be further configured to process an event triggered according to one of the plurality of instruction sets based on the criticality factor of the one of the plurality of instruction sets.

In still another aspect of the disclosure, a method of a computing system is described. The method may include calculating a trace distribution associated with an execution path of an instruction set. The method may further include assigning a score to the instruction set based on the trace distribution associated with the execution path of the instruction set. The method may further include controlling handling of an event associated with an execution of the instruction set based on the score.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 illustrates a flowchart of an example method of processing and handling events associated with services composing an application implemented with an MSA or other SBA.

DETAILED DESCRIPTION

Figure 1:
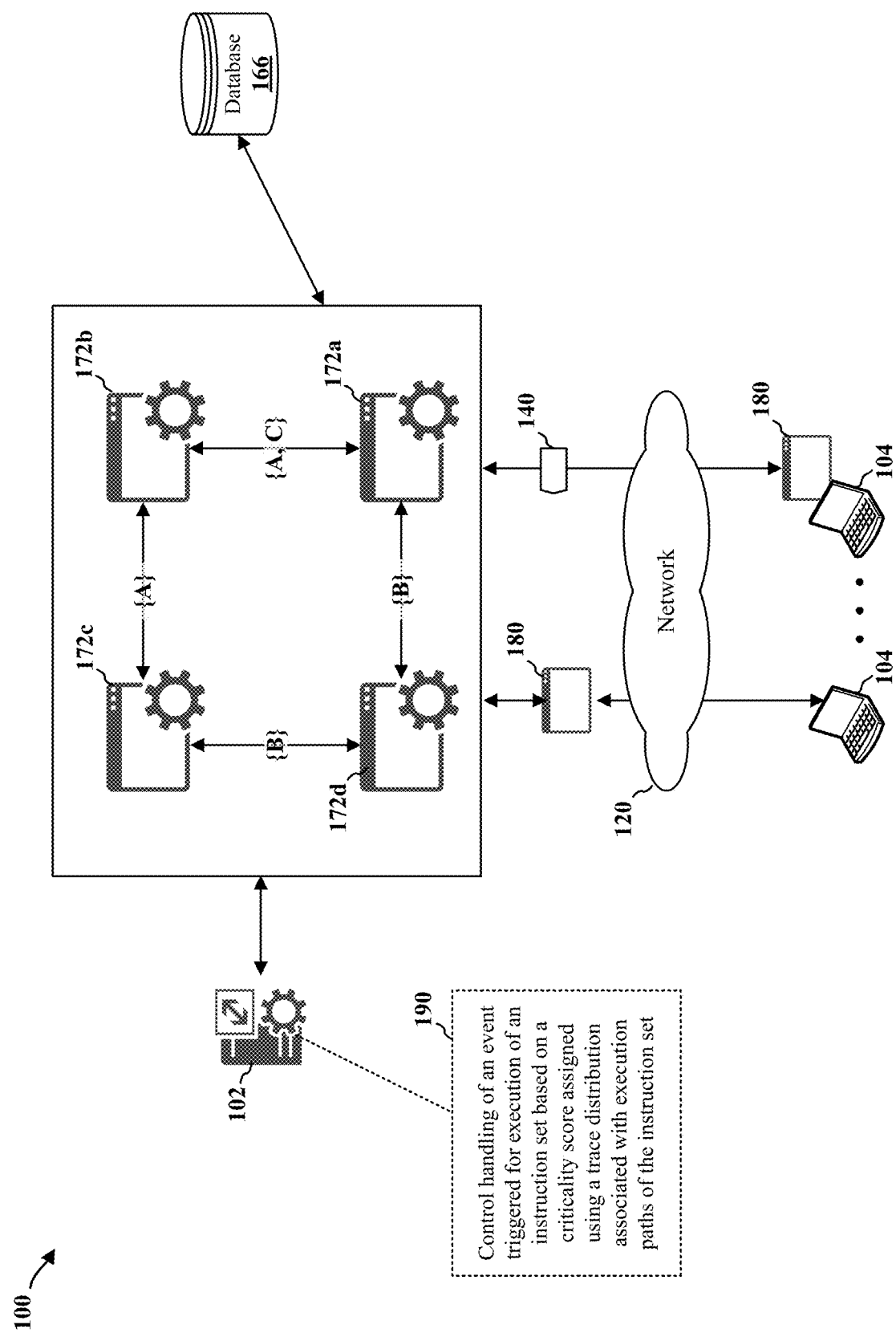
FIG. 1 is a diagram illustrating an example of a computing environment having a microservices architecture (MSA) or other service-based architecture (SBA).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, a person having ordinary skill in the art will recognize that these concepts and related aspects may be implemented in the absence of some or all of such specific details. In some instances, structures, components, and the like which are known in the art may be omitted from some diagrams in order to avoid obscuring the concepts and various aspects of the present disclosure.

Several aspects of computing systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

Distributed systems may broadly refer to the widely adopted computing paradigm in which a computing environment includes multiple components spread across multiple computing devices. The components may include hardware components (e.g., processors, memory, etc.) and/or software components (e.g., logical functions, virtual systems, etc.) that are interconnected and capable of communication and coordination. Potentially, the components and/or computing devices may be remotely located from one another and/or from an end-user device.

Interconnected components and/or computing devices may communicate over networks using message passing, which may allow one component or device to access the functionality or obtain a result provided by another component or device. Often, the more functionality one component or device accesses through other components or devices, the greater the volume of messages passed.

Service-based architecture (SBA), such as microservices architecture (MSA) and service-oriented architecture (SOA), and similar or related concepts, such as software as a service (Saas) and cloud computing, may be seen as the evolution of the distributed environment paradigm. In many instances of the aforementioned architectures and related similar concepts, some discrete overarching functionality may be componentized and/or distributed, potentially across a heterogeneous network.

Illustratively, MSA may include an application that is componentized such that the application functionality may be realized through multiple microservices (which may also be referred to simply as "services") that can be abstractedly provisioned with location transparency. In some aspects, some or all services invoked for an instance of an application may be loosely coupled, for example, in that services operate transparently, autonomously, and abstractly. In some aspects, each of the services functions autonomously to provide a discrete subset of application functionality, e.g., so that services may be abstractly viewed as black boxes that return information expected to contribute to the overall application functionality.

Each of the constituent services (including microservices) of which an application is composed may be an instruction set that provides a discrete unit of functionality. For example, a service may be a self-contained or autonomous set of instructions, stored in a memory, that implements a capability within a bounded context (or within a domain model) upon execution by a processor. The capability may be a business capability, a computational capability (e.g., a mathematical function), and/or other discrete functionality, which may be expected to return a result and/or achieve a purpose that facilitates, enables, and/or accomplishes some portion of application functionality.

SOA may be similar to MSA, although instead of an application, SOA may implement a business service (e.g., calculating a value indicative of an individual's creditworthiness, estimating gain or loss of a stock listed on an exchange, forecasting a quarterly expense, etc.). To that end, SOA may be uniquely suited to enterprise systems. For example, multiple business services may be spread across multiple devices and/or locations, but each of the business services may be accessible over an enterprise network. In practice, however, SOA may overlap with MSA, e.g., as a well-defined line separating an "application" from a "business service" may not always exist.

In the interest of clarity and conciseness, the present disclosure may use certain terminology from MSA and/or another architecture to described some aspects and concepts. However, one having ordinary skill in the relevant art will readily appreciate that various aspects and concepts described herein may be applicable to other similar areas, such as business services, SOA, SaaS, cloud computing, and other similar or related distributed and/or modularized computing systems and environments. By way of illustration, use of the term "application" should not necessarily be construed as limiting aspects or concepts to MSA. Rather, in some instances, "application" may refer to some software and/or other component that is designed and/or intended to accomplish one or more purposes, potentially in response to user input and/or implemented (at least in part) in a stack at a topmost layer (e.g., an application layer) or another layer relatively nearer to the topmost layer than the lowest layer.

Various principles related to SOA and/or MSA may be further realized where services act as black boxes (service abstraction), services operate independently and control their own functionality (e.g., service autonomy), services return either valid information or throw an exception (e.g., service statelessness), services rely on other services (e.g., service composability), services are supplemented with some metadata enabling identification and/or communication (e.g., service discovery), logic is divided across various services (e.g., service reusability), and/or other concepts that may be consistent with and/or promote environments having SOAs.

However, many features of one or both of SOA and/or MSA often cited as advantageous, such as scalability, reusability, flexibility, and so forth, may coincide with some less attributes. For example, the loose coupling and composability of SBA may effectively result in a substantial and nonnegligible amount of message passing, which may appreciably increase overhead in terms of network load, computational resource consumption, and the like. Such overhead may be exacerbated by application complexity, service heterogeneity, and the absence of a uniform framework applicable to all services.

SBA, such as MSA and SOA, may be broadly applicable across many fields of industry, as potentially any application or service can be provisioned through SOA or MSA. Due to this broad applicability, the procedures, directives, administration, regulations, and other such factors tending to influence application deployments may vary substantially across organizations, regions, and so forth. On the user end, SBA may increase the availability and accessibility of an application or service to users of different backgrounds, abilities, cultures, locations, etc. In order to increase the relevancy, usability, etc. of an application or service, rules, policies, roles, relationships, and the like, may be implemented to collect some contextual information and adapt various features to the collected information. Such rules, policies, roles, relationships, and so forth may effectively actualize the scope and/or domain of a context in which applications, services, etc. are provisioned.

Illustratively, a context may be realized through mechanisms designed to support or carry out processes, regulate and restrict inputs/outputs and/or other operations, increase usability, allocate resources and/or limit resource consumption, handle unintended incidents (e.g., errors, exceptions, failures, etc.), provide data integrity and/or data security, reconfigure a user interface, and/or otherwise delineate and promote some or all intended functionality of an application.

Potentially, a context may include a business context, which may be put into practice through one or more rules, policies, roles, relationships, so forth that configure an application to operate in a manner that is consistent with and/or takes into account the purpose of the application (e.g., a business purpose), information about the user (e.g., customer), and/or other information relevant to a business context.

In many instances, the services of which an application is composed may be autonomous and/or independently designed for reusability. For example, an application may be composed of multiple different services compiled using multiple different program languages and/or platforms. While application programming interfaces (APIs) may enable interoperability and aggregation of services, assumptions regarding service execution and/or communication cannot necessarily be made without risking robustness. For example, type, content, and/or format of messages received from various services cannot necessarily be assumed to be expected. Moreover, services may be largely agnostic to which application or other service invokes them. That is, outputs of services may not be specific to the service, application, or instance to which those outputs are provided.

Even in addition to the foregoing, service interactions are further complicated by location transparency and autonomy, as each service may individualistically handle various events, such as errors, exceptions, failures, alerts, warnings, notifications, logging, etc., which may be triggered by service execution.

Services may return messages indicating such events, e.g., either as a return value or supplementary information, and the indicated event may be propagated through to a user interface or other service. At some point, such as at the user interface, a log file, etc., events may adversely affect system and/or application performance and/or may degrade user experience. For example, events may consume space on a display so that some portion of the interface presented to the user is obscured and/or events may consume computational resources (e.g., memory and/or instruction cycles), which may increase latency or overwhelm system resources.

One approach to handling events originating at different services is manual intervention, in which a human administrator addresses the events before those even cause an application failure and/or reach an end user (e.g., customer). Given the number of services of which an application is composed, the number of simultaneous instances of an application that may be running, and the speed (or lack thereof) with which manual system administration occurs, this approach is unlikely to provide satisfactory system performance, and is prohibitively expensive when scaling.

Another approach is to hardcode tags to indicate the importance, priority, and/or effect of events, which may be referred to as an event's "criticality" in some aspects. However, operating in a contextually aware manner may be inherently dynamic (e.g., location and preferences may vary across users, time and season may vary across different instances of the application, etc.), and consequently, hardcoding tags addresses a dynamic issue in a static manner, thereby leading to events being processed in a manner that is incongruous or inappropriate with different instances of an application. However, a mechanism for dynamically handling events generated by services may be absent from MSA, as well as SOA and other similar/related concepts. Thus, a need exists for an approach to dynamically handling events that are triggered during executions of services.

The present disclosure provides various techniques and solutions for dynamically managing and processing events of services that may be triggered according to different instances of an application. Effectively, events may be managed and processed based on contextual information derived from various instances of an application. Specifically, the present disclosure describes various techniques and solutions in which respective execution paths are found for each service executed as part of a complete application, as well as the traces of those execution paths over one or more time intervals. A trace distribution may be forecasted for each service based on the execution paths and the traces of over those execution paths over one or more time intervals. Based thereon, a criticality score may be assigned to each of the services, and events originating with the services may be processed or handled according to the assigned criticality scores, e.g., relative to one another and/or in comparison with one or more thresholds.

In so doing, the effects of various services may be considered, e.g., in a business context, and decisions regarding the processing or handling of events may be made in a manner that reduces or mitigates the effects of some services in favor of robustly and efficiently providing application functionality. Such techniques and solutions may decrease latency and/or other overhead, which may improve application performance and user experience.

FIG. 1 is a diagram illustrating an example of a system and network 100 having an SBA (e.g., an MSA). As shown in FIG. 1, in an aspect of the present invention, an application 180 may be accessible via a terminal 104, such as a personal computer (PC), a minicomputer, a mainframe computer, a microcomputer, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device having a processor and some degree of input-and-output (I/O) capability, such as a display, a touchscreen, a keyboard, a mouse, and forth. The terminal 104 is connected to a network 120, such as the Internet, an intranet, and/or an enterprise network, and some or all application functionality is accessible at the terminal 104 via the network 120.

The application 180 may be a standalone application or a suite of applications. For example, the application 180 may be a word processor or other document editor, an image or video editing application, another multimedia application, a spreadsheet editor, a payroll and/or invoice application, a distribution and/or acquisition application, an enterprise application or suite of applications, or essentially any other application designed for some purpose and/or to provide some functionality.

The application 180 may be composed of a plurality of microservices 172a-172d, which may also be referred to as "services." The services 172a-172d may be deployed across different systems, across different geographic locations, different operators or providers, and/or otherwise implemented according to a distributed computing paradigm. In other words, the application 180 may not be monolithic. Each of the services 172a-172d may be a set of instructions that, when executed by at least one processor, provide some subset of the application functionality or otherwise enable the application functionality (e.g., one or more of the services 172a-172d may be implemented as hardware, software, firmware, or some combination thereof). For example, a first service 172a may include an API exposing some other services 172b-172d that may be executed for the application 180.

An orchestrator 102 may be connected with some or all of the services 172a-172d, e.g., via one or more networks. The orchestrator 102 may be implemented as hardware, software, firmware, or any combination thereof. Further, the orchestrator 102 may be automated, the orchestrator 102 may be controlled by a person (e.g., a system administrator), or the orchestrator 102 may be implemented through some combination of the two.

The orchestrator 102 may be responsible for management and orchestration of the services 172a-172d. For example, the orchestrator 102 may control some load balancing, message passing, error handling, logging, and so forth. In some embodiments, the orchestrator 102 may be responsible for populating log files based on transactions according to which services 172a-172d are executed for the application 180. For example, a transaction may include a set of messages passed between some or all of the services 172a-172d in response to a request, which may originate with a terminal 104, the orchestrator 102, and/or a terminal 104.

Each of the services 172a-172d may be loosely coupled, self-contained, and/or independently deployable. For example, one or more of the services 172a-172d may be reused across multiple different applications. In some aspects, one or more of the services 172a-172d may provide a capability, which may be well-defined and/or within a bounded context (e.g., a domain model). According to some implementations, a capability may be defined as a business capability and/or as function that enables a business capability.

Some or all of the services 172a-172d may be implemented at respective computing systems that may be remotely located and accessible via one or more network (e.g., the network 120, the Internet, etc.). The location of each computing system at which each of the services 172a-172d is executed may be transparent. For example, each of the services 172a-172d may be stored at a respective server, and each of the servers may be accessible over one or more networks, but messages may be passed between the services 172a-172d in the same fashion regardless of distances or other differences between implementations.

One or more of the services 172a-d may have at least one dependency, which may be at least one other service on which a service relies in order to accomplish its intended functionality. By way of example, an application 180 may be an email client composed of a message retrieval service configured to retrieve email messages of a single user, and the message retrieval service may be dependent upon an authentication (auth) service that validates the user attempting to view email messages and passes at least one value identifying the user to the message retrieval service so that the message retrieval services is provided a context defining which email messages to retrieve. In such an example, the email client may be composed of service dependencies including the message retrieval service and the auth service, and the message retrieval service may rely upon the auth service for operation in a general or average case.

In some aspects, each of the services 172a-172d may be autonomous. While one or more of the services 172a-172d may include at least one dependency, a dependency may not be necessary for a service to execute in an expected or defined manner, even where that expected or defined manner is an edge case, corner case, or other such case that departs from a general case, average case, or other similar case that is generally understood to be the customary use case of the service. Some non-limiting examples of an undefined or unexpected execution may include an infinite loop and an application crash, whereas some non-limiting examples of an edge case or corner case may include re-prompting for input of a password when an incorrect password is entered and outputting an informational notification that a timeout has occurred when a response from a dependency service is absent for a predetermined (or earlier determined) period of time.

Illustratively, the message retrieval service may be dependent on the auth service, but the failure of the auth service to validate a user may not cause the message retrieval service to throw an error or exception or otherwise break out of instruction execution. Rather, the message retrieval service may return a notification indicating that the user is not authorized to view requested email messages because the user cannot be validated. Thus, the message retrieval service may autonomously execute, although such execution may include instantiating, invoking, or otherwise calling the auth service and/or another dependency service.

The application 180 may include an entry point, which may be user-facing, such as a graphical user interface (GUI) or the like. The entry point (e.g., GUI) may itself be a service, which may be partially or fully locally implemented at a terminal 104 and/or may be remotely accessible via a terminal 104 connected to a network, such as through a network browser (e.g., a web browser) via a uniform resource identifier (URI). The entry point may enable a user at a terminal 104 to perform some capability, such as where a user inputs a selection through a terminal 104.

In accessing some functionality of the application 180, one or more of the services 172a-172d may be executed. For example, a request may be issued to the application 180, e.g., via the entry point as user input is received at a terminal 104. The request may directly or indirectly cause one or more of the services 172a-172d to be executed. That is, the request may cause messages to be passed between some or all of the services 172a-172d, as a request may cause messages to traverse some dependency services, which may be instantiated or invoked in order to provide the capability of a service. The set of messages passed between services 172a-172d in order to fulfill one request may be traced, and the orchestrator 102 may log each trace in a database 166 or other similar storage. Each of the services 172a-172d that is executed for a request may compose an execution path.

Illustratively, a request 140 issued by a terminal 104 may be intended for a capability provided by a third service 172c. In order to provide the capability indicated by the request 140, messages may be passed from the first service 172a to a second service 172b and from the second service 172b to third service 172c. Therefore, a first execution path {A} associated with the third service 172c may include the first service 172a and the second service 172b. The orchestrator 102 may log information indicating a trace of this first execution path {A} in the database 166 in association with the request 140.

Because some or all of the services 172a-172d may be loosely coupled and/or independently deployable, the third service 172c may be accessible via more than one execution path. By way of illustration, another request may be issued by a terminal 104 for the third service 172c, but the other request may be different from the first request 140 in some manner (e.g., the other request may be issued from a different point within the application 180). As such, the other request may cause execution of a different set of services than the first request 140. For example, the other request may traverse a second execution path {B} associated with the third service 172c. The second execution path {B} may traverse the first service 172a, a fourth service 172d, and then the third service 172c. The orchestrator 102 may log information indicating a trace of this second execution path {B} in the database 166 in association with the other request.

One or more of the services 172a-172d may be dependency services of another service in some instances and may provide some requested capability in other instances. For example, a third request may be issued by a terminal 104 for a capability provided by the second service 172b. A third execution path {C} associated with the second service 172b may include the first service 172a (but may exclude the third service 172c and the fourth service 172d). The orchestrator 102 may log information indicating a trace of this third execution path {C} in the database 166 in association with the third request.

The orchestrator 102 may log traces of the execution paths for each request issued by each terminal 104. Potentially, traces of execution paths may be stored for requests originating through other applications. In some aspects, a trace may be captured for each request so that each instance of a service is logged as part of an execution path. The orchestrator 102 may log some metadata in association with each of the traces, such as a timestamp, location stamp, or other information that may be used to differentiate traces from one another (e.g., as with a primary key), either alone or in combination with some other metadata.

According to aspects described herein, the orchestrator 102 may be configured to process an event that is triggered by execution of one of the services 172a-172d. For example, the orchestrator 102 may be configured to control handling (190) of an event triggered for execution of one of the services 172a-172d based on a criticality score assigned using a trace distribution associated with execution paths of the one of the services 172a-172d. Examples of an event may include at least one of a notification configured to be output, an entry configured to be written to a log, an error or exception report, and/or an interrupt configured to pause execution of one of the services 172a-172d.

The orchestrator 102 may be configured to supplement each event with some context that enriches the event. In so doing, events may be processed or handled according to their relative criticality to the functionality of the application 180 and/or capability of the service. Such supplement may be realized through a score or factor (e.g., a criticality score) that is assigned to each of the services 172a-172d so that an event triggered by one of the services 172a-172d may be treated in a way that is consistent with the criticality or importance of the respective one of the services 172a-172d that caused the event to be triggered.

In some aspects, the scores for the services 172a-172d may be based on the execution paths, as logged in the traces stored in the database 166. Accordingly, the orchestrator 102 may be able to quickly and efficiently evaluate the handling of an event according to the score assigned to the service that triggered the event. Thus, the score may reduce the frequency with which traces are analyzed while still providing an effective indicator of the relative criticality of a service, as measured based on traces of execution paths that include the service.

Figure 2:
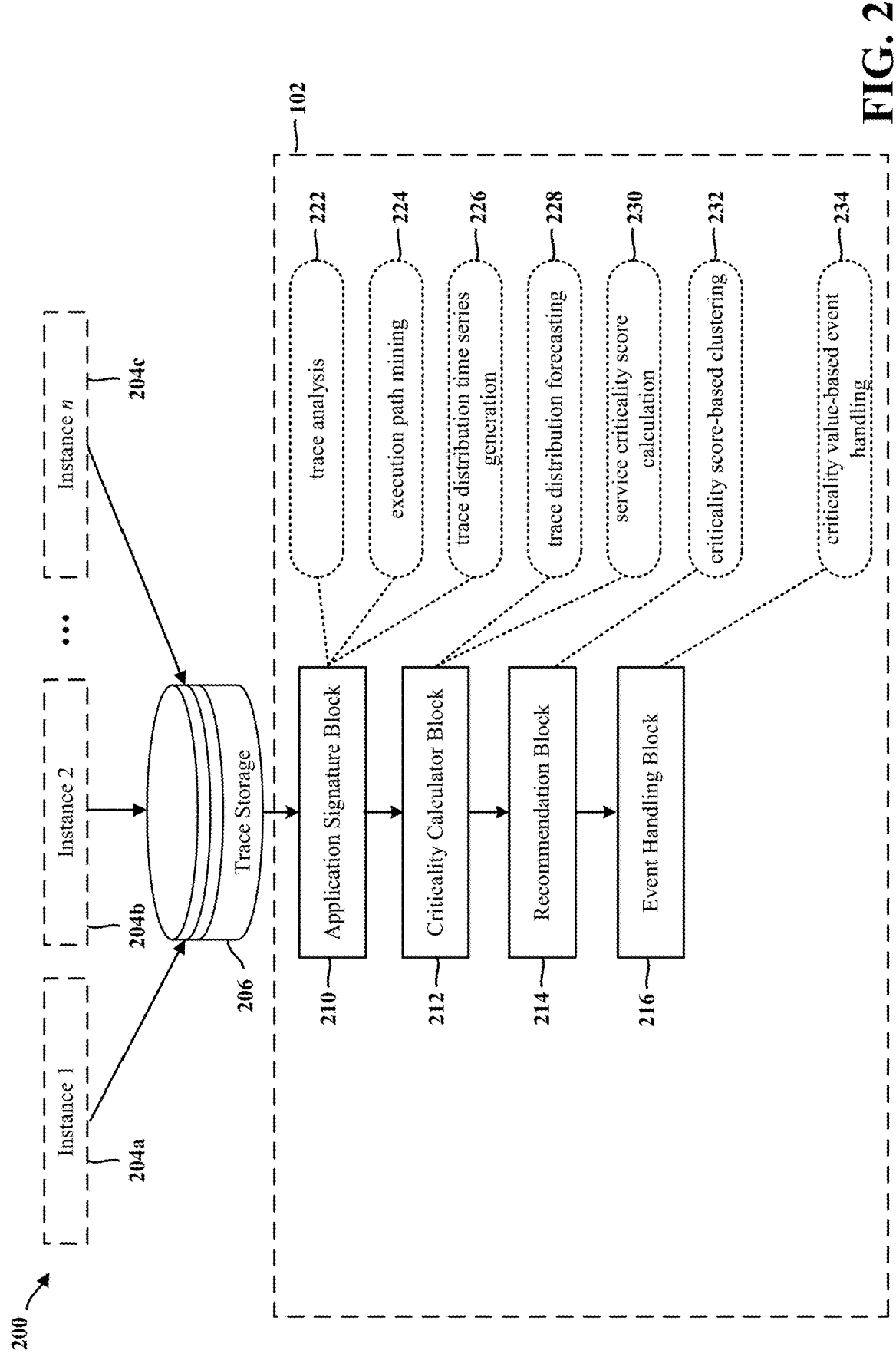
FIG. 2 is a conceptual block diagram illustrating an example of an orchestrator configured to manage events associated with services of an application.

FIG. 2 is a conceptual block diagram 200 illustrating an example of an SOA orchestrator 102 configured to manage events associated with services of which an application 180 is composed. An application 180 may be instantiated according to each terminal 104 that accesses it. For example, application instances 204a-204c may be instances of the same application. In some other examples, however, one or more of the application instances 204a-204c may be instances of different applications. In either case, the application instances 204a-204c may share some or all of the same services.

The orchestrator 102 may include or may be connected with a trace storage 206, which may be a local or remotely accessible database or other storage device(s). Trace storage 206 may store some or all log files indicating transactions for one or more applications, such as log files reflecting requests, responses, and other messages passed between services. For example, some or all log files for application instances 204a-204c may be stored in trace storage 206.

As requests are issued for application instances 204a-204c, the traces of execution paths for the services (directly or indirectly) executed based on such requests may be logged into trace storage 206. The traces may be logged with metadata, such as a timestamp (e.g., time of request), location stamp (e.g., location of request), and/or other stamp or tag associated with the trace.

Figure 3:
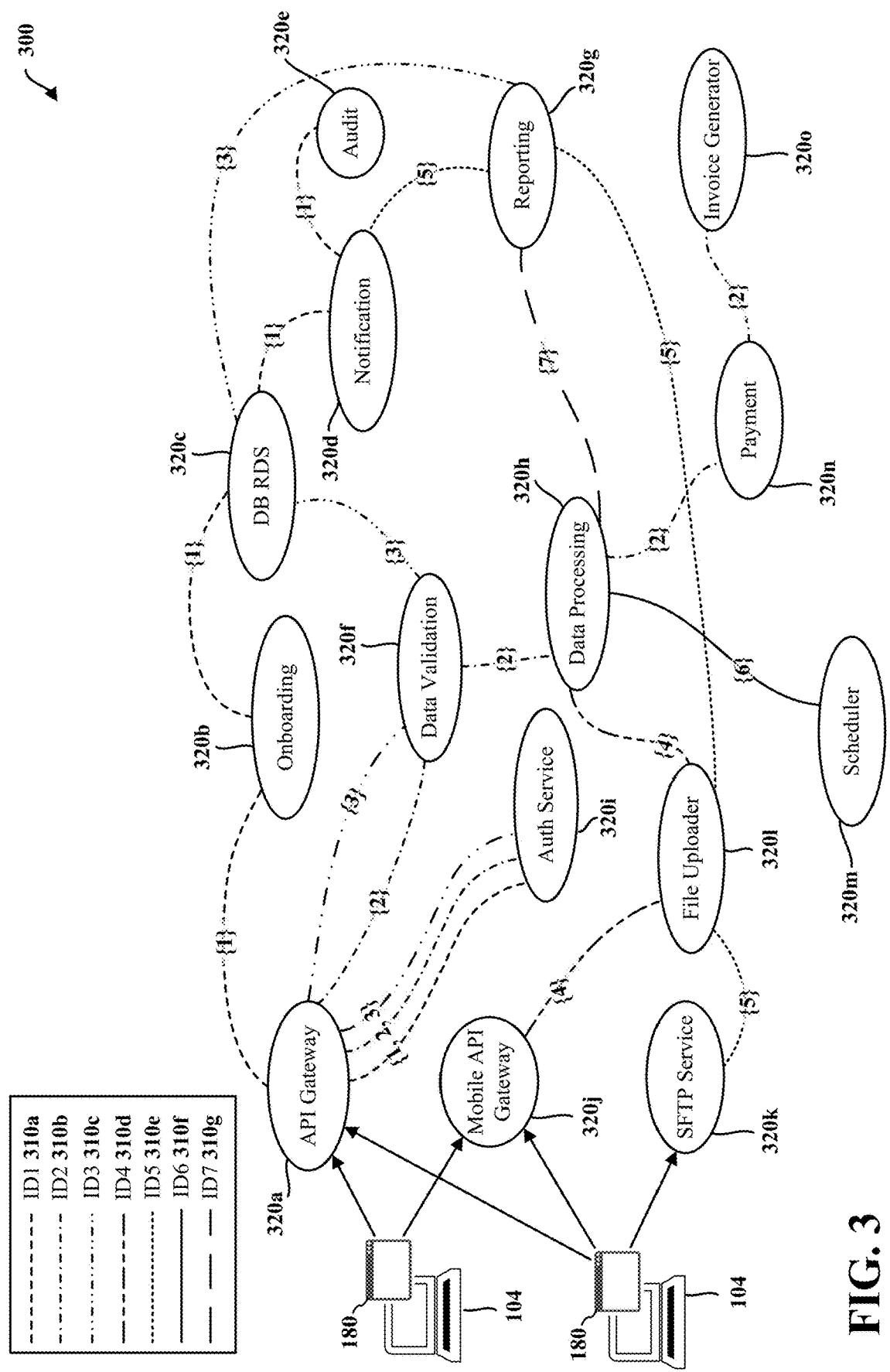
FIG. 3 is a diagram an example of execution paths traced for services of one or more applications that are implemented with an MSA or other SBA.

As shown in FIG. 3, a diagram 300 illustrates an example of execution paths 310a-310g traced for services 320a-320o of one or more applications. For example, the application instances 204a-204c may be instantiated for an application 180 that is composed of fifteen services 320a-320o: API Gateway Service 320a, Onboarding Service 320b, Database (DB) Relation DB Service (RDS) 320c, Notification Service 320d, Audit Service 320e, Data Validation Service 320f, Reporting Service 320g, Data Processing Service 320h, Auth Service 320i, Mobile API Gateway Service 320j, Secure File Transfer Protocol (SFTP) Service 320k, File Uploader Service 320l, Scheduler Service 320m, Payment Service 320n, and Invoice Generator Service 320o.

Requests may be issued for different ones of the services 320a-320o, and each request may cause messages to be directly or indirectly passed between a set of service dependencies and the requested service. For example, a terminal 104 may issue a request, which may be received as user input requesting some functionality provided by the application. In some other examples, requests may be issued absent user input, such as with automated or periodic requests.

Messages passed in order to fulfill a request associated with an application may trace one of the execution paths 310a-310g, which may reflect the services executed in response to a request. Trace information may be logged in order to record the execution path traced for each request. In some aspects, trace information may be logged along with metadata that may be used to differentiate the trace from other traces. For example, trace information may be tagged with some contextual information related to a request that initiated a trace. Examples of such tags may include a timestamp and/or other data/time information, a location stamp indicating a geographic location or region from which a request originated, information associated with a user of a terminal 104, information associated with a terminal 104 itself, or other similar metadata with which trace information may be tagged.

In some aspects, multiple execution paths may be traced for one or more of the services 320a-320o, and which of the multiple execution paths is traced at a given time may be a function of the request, a state of the application, a time, a location, and/or other contextual information with which a trace may be tagged. For example, a Reporting Service 320g may be executed in one context in which a Data Processing Service 320h is executed first. According to such an execution of the Reporting Service 320g, trace information may be logged indicating the seventh execution path 310g is traced in such a context. Potentially, the context may be logged as metadata in association with the trace information.

In other instances, however, the Reporting Service 320g may be executed according to a request of a terminal 104, and messages associated with the request may be traced along the third execution path 310c, which may include API Gateway Service 320a, Data Validation Service 320f, and DB RDS 320c, in addition to Reporting Service 320g. In still other instances, a different request may cause the Reporting Service 320g to be executed, and messages associated with the other request may be traced along the fifth execution path 310e.

In some other aspects, an execution path may include a single service. For example, if a service is entirely self-contained and autonomous such that the service is able to handle a request entirely internally without passing messages to other services, then the execution path traced for such a service may include only the one service.

While various permutations of execution paths are possible (e.g., depending upon the implementation, abstraction, etc.), FIG. 3 shows an example of execution paths that may be traced for executions of services composing an application. The non-exhaustive and non-limiting example shown in FIG. 3 may include multiple execution paths that may be traced. It should be appreciated that the execution paths illustrated in FIG. 3 provide non-limiting examples of services that may compose, and do not necessarily represent sequential flows or data flows for services. Rather, in some embodiments, services on an execution path may be called in any order, and potentially more than once on an execution path, for an application.

A first execution path 310a may be traced across API Gateway Service 320a and Auth Service 320i. The first execution path 310a may further include another branch, which may include another set of dependency services that may be executed independently of and separately from the aforementioned API Gateway Service 320a and Auth Service 320i, which similarly may be a set of dependency services. Accordingly, the first execution path 310a may further be traced across API Gateway Service 320a, Onboarding Service 320b, DB RDS 320c, Notification Service, and Audit Service 320e.

In some aspects, data returned from execution of services traced along one branch (e.g., set of dependencies) may be used to control or influence services traced along another branch (e.g., another set of dependency services), even though the two branches may otherwise be executed independently of one another. For example, a trace of the first execution path 310a to Onboarding Service 320b and other services along that branch may be contingent upon the Auth Service 320i validating a user or otherwise providing a security or authorization check.

A second execution path 310b may be traced across API Gateway Service 320a and Auth Service 320i along one branch, and may be traced across API Gateway Service 320a, Data Validation Service 320f, Data Processing Service 320h, Payment Service 320n, and Invoice Generator Service 320o along another branch.

A third execution path 310c may be traced across API Gateway Service 320a and Auth Service 320i along one branch, and may be traced across API Gateway Service 320a, Data Validation Service 320f, DB RDS service 320c, and Reporting Service 320g along another branch.

A fourth execution path 310d may be traced across Mobile API Gateway Service 320j, File Uploader Service 320l, and Data Processing Service 320h.

A fifth execution path 310e may be traced across SFTP Service 320k, File Uploader Service 320l, and Reporting Service 320g.

A sixth execution path 310f may be traced across Data Processing Service 320h and Scheduler Service 320m.

A seventh execution path 310g may be traced across Data Processing Service 320h and Reporting Service 320g.

Referring again to FIG. 2, the orchestrator 102 may include a set of blocks 210, 212, 214, 216, each of which may be implemented as hardware, software, firmware, or some combination thereof. For example, the orchestrator 102 may include an application signature block 210, a criticality calculator block 212, a recommendation block 214, and/or an event handling block 216.

The application signature block 210 may be configured to access trace information logged in the trace storage 206, and perform trace analysis 222 based on the trace information. For example, the application signature block 210 may select trace information for a time period of X hours. The time period may be a sliding window or may be a fixed window for one or more applications composed of the services 320a-320o to evaluate the criticality, priority, importance, etc. of the services 320a-320o relative to one another.

Additionally or alternatively, the application signature block 210 may select trace information associated with another tag or other metadata, such as a location stamp.

The application signature block 210 may then be configured to perform execution path mining 224. In particular, the application signature block 210 may evaluate the trace information to mine the execution paths traced for requests. For example, the application signature block 210 may identify a set of uniquely identifiable messages between a subset of the services 320a-320o that were passed between the subset of the services 320a-320o based on the same root request. For example, the set of messages may include the same transaction ID or another common value(s) indicative of a common transaction.

Execution path mining 224 may include tracing a transaction from a root request (e.g., issued by a terminal 104) to each of the messages that is (directly or indirectly) passed between a subset of the services 320a-320o for the transaction. In other words, execution path mining 224 may include identifying an execution path from a transaction, and the execution path may indicate each of the services 320a-320o that is executed for the transaction, and potentially, the sequence(s) and/or branches according to which the subset of the services 320a-320o is executed.

In some further aspects, the application signature block 210 may perform execution path mining 224 based on some supplementary information, such as some contextual information associated with the transaction (e.g., location from which the transaction originated, demographic of user from which the transaction originated, etc.). For example, the application signature block 210 may tag an execution path with contextual information, which potentially may result in duplicate execution paths being identified, although the execution paths may be distinguishable based on variations between the contextual information with which each of the paths are tagged.

The application signature block 210 may generate execution path IDs for each of the identified execution paths. For example, the application signature block 210 may generate a unique value for each unique execution path, and the application signature block 210 may store the unique value with information indicating the association to the corresponding unique execution path. For example, the application signature block 210 may generate the execution path IDs ID1 through ID7 to uniquely identify the execution paths 310a-310g.

In some further aspects, the application signature block 210 may generate execution path IDs for each of the identified execution paths based on some supplementary information, such as some contextual information associated with the transaction (e.g., location from which the transaction originated, demographic of user from which the transaction originated, etc.). For example, the application signature block 210 may tag an execution path with contextual information, which may result in duplicate execution paths being uniquely identifiable based on variations between the contextual information with which each of the paths are tagged. For example, the fourth execution path 310d from Mobile API Gateway Service 320j, File Uploader Service 320l, and Data Processing Service 320h may be identified as ID4 when the transaction originated from a California location, but may be identified as ID8 when the transaction originated from a New York location.

Additionally, the application signature block 210 may be configured to perform trace distribution time series generation 226. Trace distribution time series generation 226 may include determining a distribution of the mined execution paths 310a-310g over a series of intervals composing the time series. For example, the time series may be composed of X hour-long time periods for a window of X hours (although other divisions are also contemplated herein). The time series may be over a sliding window or a fixed window for one or more applications composed of the services 320a-320o.

As described herein, the orchestrator 102 may retrieve some or all of the log files reflecting the transactions issued for the application 180 and causing execution of one or more of the services 320a-320o. According to the execution path mining 224, the application signature block 210 may count the number of transactions for each execution path. For example, the application signature block 210 may select all the transactions having respective times that fall within one or more time periods of a fixed or sliding time window (e.g., time periods $P_1, P_2, \ldots, P_n$), and then the application signature block 210 may increment a respective counter value corresponding to one of the execution paths for each transaction along that execution path.

In some aspects, the application signature block 210 may count the number of transactions for each of the execution paths 310a-310g across each of the application instances 204a-204c for one application. In some other aspects, the application signature block 210 may count the number of transactions for each of the execution paths 310a-310g across application instances 204a-204c for any application that includes the services 320a-320o.

The application signature block 210 may calculate the total transactions and the number of instances of each of the services 320a-320o. For example, the application signature block 210 may add together each of the counter values in order to obtain the total transactions that occurred over the one or more time periods (e.g., time periods $P_1, P_2, \ldots, P_n$). Additionally, the application signature block 210 may, for each one of the services 320a-320o, add together each of the counter values of counters corresponding to execution paths 310a-310g that includes that one of the services 320a-320o.

For example, the application signature block 210 may count the number of transactions across all of the execution paths 310a-310g ID1 through ID7 over one or more time periods (e.g., time periods $P_1, P_2, \ldots, P_n$), such as by calculating the total number of transactions over all of the execution paths 310a-310g beginning at the start of one time period and concluding at the end of the one time period. The application signature block 210 may count the total number of transactions that trace across the execution paths 310a-310g over all instances 204a-204c of the application.

Illustratively, the application signature block 210 may evaluate a 24-hour window that is divided into six (6) time periods $P_1, P_2, P_3, P_4, P_5, P_6$ of four (4) hours each. In the first four-hour time period $P_1$, the application signature block 210 may determine, from the logs stored in trace storage 206, 100 total transactions were issued in which at least one of the services 320a-320o was executed or instantiated, e.g., as the log files may indicate one or more of the execution paths 310a-310g can be traced during the time period $P_1$. Similarly, the application signature block 210 may determine, from the logs stored in trace storage 206, that fifty (50) total transactions can be traced in the second time period $P_2$, fifty-six (56) total transactions can be traced in the third time period $P_3$, eighty (80) total transactions can be traced in the fourth time period $P_4$, 100 total transactions can be traced in the fifth time period $P_5$, and 200 transactions can be traced in the sixth time period $P_6$.

Further, the application signature block 210 may, for each one of the execution paths 310a-310g, count the number of transactions that trace the respective one of the execution paths 310a-310g during each of the time periods (e.g., time periods $P_1, P_2, \ldots, P_n$). For example, the signature block 210 may count the forty-five (45) transactions that trace the first execution path 310a ID1 out of the 100 total transactions traced during the first time period $P_1$. The application signature block 210 may count the number of transactions that trace the respective one of the execution paths 310a-310g across all of the instances 204a-204c of the box.

Further to such an example, the application signature block 210 may count thirty-three (33) transactions that trace the first execution path 310a ID1 in the second time period $P_2$, fifty-six (56) total transactions that trace the first execution path 310a ID1 in the third time period $P_3$, forty (40) transactions that trace the first execution path 310a ID1 in the fourth time period $P_4$, zero (0) transactions that trace the first execution path 310a ID1 in the fifth time period $P_5$, and twenty (20) transactions that trace the first execution path 310a ID1 in the sixth time period $P_6$.

For each of the time periods (e.g., time periods $P_1, P_2, \ldots, P_n$) composing the time series, the application signature block 210 may calculate the quotient of the number of transactions that trace a respective one of the execution paths 310a-310g divided by the total number of transactions that trace any of the execution paths 310a-310b. For example, the application signature block 210 may calculate the quotient of forty-five (45) transactions issued for the first execution path 310a ID1 divided by 100 total transactions issued over the execution paths 310a-310g ID1 through ID7, and the application signature block 210 may calculate the quotient to be equal to 0.45.

TABLE 1 illustrates an example of trace distribution time series generation 226, which reflects the distribution of transactions issued on execution paths 310a-310g of an application over the time periods $P_1, P_2, P_3, P_4, P_5, P_6$ of a window:

TABLE 1

|  | $P_1$ | $P_2$ | $P_3$ | $P_4$ | $P_5$ | $P_6$ |
| --- | --- | --- | --- | --- | --- | --- |
| Path ID1 | $\frac{45}{100} = 0.45$ | $\frac{33}{50} = 0.66$ | $\frac{56}{56} = 1$ | $\frac{40}{80} = 0.5$ | 0 | $\frac{20}{200} = 0.1$ |
| Path ID2 | 0 | 0 | 0 | $\frac{40}{80} = 0.5$ | $\frac{90}{100} = 0.9$ | $\frac{30}{200} = 0.15$ |
| Path ID3 | $\frac{35}{100} = 0.35$ | $\frac{17}{50} = 0.35$ | 0 | 0 | 0 | $\frac{50}{200} = 0.25$ |
| Path ID4 | $\frac{5}{100} = 0.05$ | 0 | 0 | 0 | $\frac{5}{100} = 0.05$ | 0 |

TABLE 1-continued

|  | $P_1$ | $P_2$ | $P_3$ | $P_4$ | $P_5$ | $P_6$ |
| --- | --- | --- | --- | --- | --- | --- |
| Path ID5 | $\frac{10}{100}=0.1$ | 0 | 0 | 0 | 0 | 0 |
| Path ID6 | 0 | 0 | 0 | 0 | 0 | $\frac{100}{200}=0.5$ |
| Path ID7 | $\frac{5}{100}=0.05$ | 0 | 0 | 0 | $\frac{5}{100}=0.05$ | 0 |

The application signature block 210 may record a signature of one or more of the services 320a-320o based on the trace distribution time series generation 226. In some aspects, a signature may already exist (e.g., stored in memory or other storage) for one of the services 320a-320o for which the application signature block 210 is to record a signature. In such aspects, the application signature block 210 may record the signature of a service by updating one or more fields or properties of the existing signature with the trace distribution time series corresponding to the one(s) of the execution paths 310a-310g that include the service. In addition, the application signature block 210 may record the signature of a service by updating a field or property of the signature with a time series of a number of instances for the service, which may include the number of executions of the service across all of the application instances 204a-204c at each of the time periods (e.g., time periods $P_1, P_2, \ldots, P_n$).

In some other aspects, a signature may not exist for the one of the services 320a-320o for which the application signature block 210 is to record a signature. In such aspects, the application signature block 210 may record the signature of a service by generating a signature for the service to include one or more fields or properties of the generated signature with the trace distribution time series corresponding to the one(s) of the execution paths 310a-310g that include the service. The application signature block 210 may then store the generated signature in memory or other storage. In addition, the application signature block 210 may record the signature of a service by populating a field or property of the signature with a time series of a number of instances for the service, which may include the number of executions of the service across all of the application instances 204a-204c at each of the time periods (e.g., time periods $P_1, P_2, \ldots, P_n$).

Figure 4:
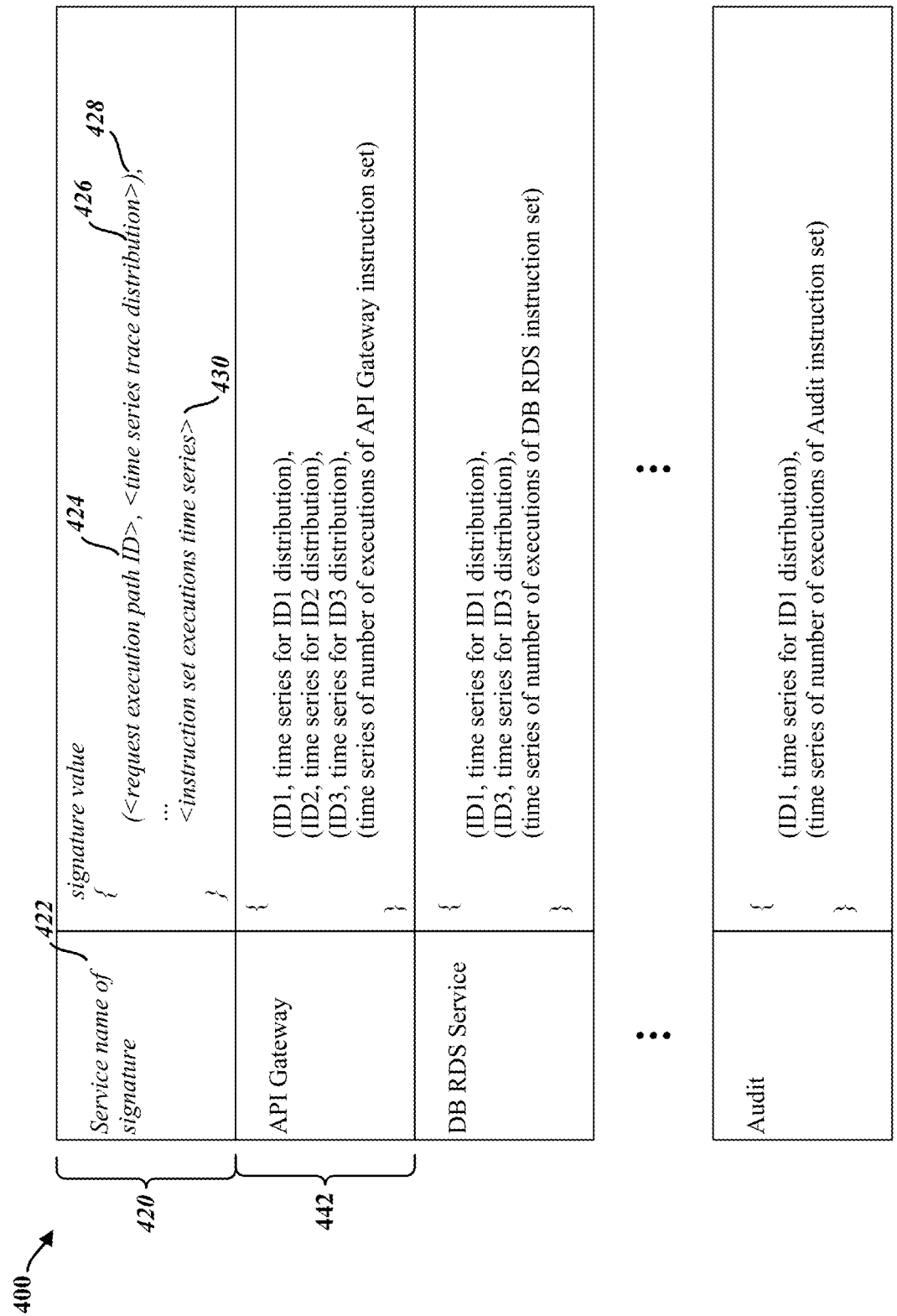
FIG. 4 is a diagram illustrating an example of a signature that may be assigned to a service of which an application is composed.

Referring to FIG. 4, a diagram 400 illustrates an example of a signature 420 that may be recorded for each of the services 320a-320o. For example, the application signature block 210 (or other component of the orchestrator 102) may record an API Gateway signature 442 by generating or updating an instance or object of the service signature type or class.

A signature 420 of a service may include a plurality of fields or properties that may be populated based on the service to which the signature 420 corresponds. For example, a signature 420 may include a name 422 and/or other value that uniquely identifies the service among the services 320a-320o.

In addition, for each signature, the application signature block 210 may record a respective entry 428 for each execution path that includes the service. For each entry 428, the orchestrator 102 may record the execution path identifier 424 corresponding to the service and information indicating the transaction or trace distribution time series 426. Illustratively, each entry 428 may include information that indicates one of the rows shown in TABLE 1, supra. For example, the API Gateway Service signature 442 may include an entry that indicates the first execution path 310a ID1, and the trace distribution time series 0.45 for period $P_1$, 0.66 for $P_2$, 1 for $P_3$, 0.5 for $P_4$, 0 for $P_5$, and 0.1 for $P_6$.

Further, for each signature 420, the orchestrator 102 may record an execution instance time series 430. The execution instance time series 430 may indicate the number of executions of the service across all application instances 204a-204c over the time periods of a window (e.g., time periods $P_1, P_2, P_3, P_4, P_5, P_6$).

Referring again to FIG. 2, the criticality calculator block 212 may perform trace distribution forecasting 228. In some aspects, the criticality calculator block 212 may forecast a trace distribution for each of the execution paths 310a-310g that include each of the services 320a-320o composing the application 180 by forecasting, for each execution path, a respective trace distribution to be approximately or equal to a respective trace distribution number corresponding to an execution path over a most recent time period $P_n$ (e.g., from a set of time periods $P_1, P_2, \ldots, P_n$). To that end, the criticality calculator block 212 may first determine the number of transactions tracing an execution path over the most recent time period $P_n$—e.g., the criticality calculator block 212 may calculate the sum of the number of transactions issued for the application 180 that traced the execution path. The criticality calculator block 212 may calculate the number of transactions issued for each of the application instances 204a-204c that traced the execution path, which may include multiple instances of the application 180 and potentially at separate locations.

In addition, the criticality calculator block 212 may calculate the number of transactions issued for the application 180 (e.g., regardless of the execution path that is traced according to the transaction) over the most recent time period $P_n$. That is, the computing system may count up the total number of transactions originating for every instance of the application over the most recent time period $P_n$. The criticality calculator block 212 may then calculate the trace distribution number for the execution path as the quotient of the number of transactions tracing the execution path associated with the application 180 divided by the total number of transactions tracing all over the execution paths 310a-310g associated with the application instances 204a-204c over the most recent time period $P_n$. Effectively, the calculated trace distribution number, which may correspond to a most recent time period $P_n$ over which transactions for the application 180 were collected and/or traced, may be used as an approach to forecasting traces for the application 180. Potentially, this approach may be less resource intensive and/or may reduce the duration experienced while some or all of the abovementioned statistics are calculated.

In some other aspects, the criticality calculator block 212 may forecast a trace distribution for another time period based on previously observed trace distribution numbers. For example, the criticality calculator block 212 may forecast a trace distribution for the current time period or the next consecutive time period (e.g., time period $P_{n+1}$) based on a sequence of preceding time periods (e.g., time periods $P_1, P_2, \ldots, P_n$). The criticality calculator block 212 may forecast the trace distribution according to the relative frequency with which each execution path is traced over one or more preceding time periods (e.g., time periods $P_1, P_2, \ldots, P_n$).

In some examples, the criticality calculator block 212 may forecast a trace distribution for one of the execution paths 310a-310g in another time period (e.g., the current time period or the next consecutive time period) by fitting the trace distribution time series 426 indicated in a signature 420 onto a time series forecasting model. The time series forecasting model may be any suitable model onto which time series data points may be fitted. For example, the time series forecasting model may be an autoregressive model, a moving average model, an autoregressive moving average model, an autoregressive integrated moving average model, an exponential smoothing model, or another forecasting model or combination of forecasting models. Potentially, the time series forecasting model may include one or more weights, constants, coefficients, orders, and/or other variables to suitably weight or otherwise improve the accuracy of forecasting the time series trace distribution of the other time period. Illustratively, given the abovementioned time series trace distribution of the first execution path 310a ID1, the computing system may fit the data points $\{(P_1, 0.45), (P_2, 0.66), (P_3, 1), (P_4, 0.5), (P_5, 0), (P_6, 0.1)\}$ to a time series forecasting model, and based thereon, the criticality calculator block 212 may forecast a trace distribution of the first execution path 310a ID1 in the next time period $P_7$ to be 0.028, which may be a found as the forecasted data point ($P_7$, 0.028).

In some aspects, the criticality calculator block 212 may configure, based on a respective signature of each service, a set of forecasted trace distribution data points of each execution path that includes the service. For example, if the first service is included in the first execution path having a forecasted time series trace distribution of 0.028 in the next time period $P_7$, and included in the second execution path having a forecasted time series trace distribution of 0.653 in the next time period $P_7$, the computing system may configured the signature of the first service to indicate the data points ($P_7$, 0.028) for the first execution path and ($P_7$, 0.653) for the second execution path.

For example, the criticality calculator block 212 may forecast a trace distribution for each of the paths 310a-320g of the services 320a-320o composing the application 180. Illustratively, for the API Gateway Service 320a included in the first (ID1) execution path 310a, the second (ID2) execution path 310b, and the third (ID3) execution path 310c, the criticality calculator block 212 may forecast the time series trace distributions in another time period as 0.028, 0.653, and 0.003, respectively. The criticality calculator block 212 may forecast a trace distribution for each path of each service composing the application using the signature 420 of the service, which may include at least one entry 428 indicating an execution path identifier 424 of an execution path including the service and the associated trace distribution time series 426 of the execution path, as well as the time series 430 of the number of executions of the service (e.g., the time series of the total number of transactions tracing the at least one execution path of the service).

TABLE 2 illustrates an example of a forecasted trace distribution based on the trace distribution time series shown in TABLE 1, supra. TABLE 2 is intended to be illustrative, and other values are possible without departing from the scope of the present disclosure, such as when different forecasting models are used.

TABLE 2

|  | $P_1$ | $P_2$ | $P_3$ | $P_4$ | $P_5$ | $P_6$ | $P_7$ |
|---|---|---|---|---|---|---|---|
| Path ID1 | 0.45 | 0.66 | 1 | 0.5 | 0 | 0.1 | 0.028 |
| Path ID2 | 0 | 0 | 0 | 0.5 | 0.9 | 0.15 | 0.653 |
| Path ID3 | 0.35 | 0.35 | 0 | 0 | 0 | 0.25 | 0.003 |
| Path ID4 | 0.05 | 0 | 0 | 0 | 0.05 | 0 | 0.006 |
| Path ID5 | 0.1 | 0 | 0 | 0 | 0 | 0 | 0.0 |
| Path ID6 | 0 | 0 | 0 | 0 | 0 | 0.5 | 0.347 |
| Path ID7 | 0.05 | 0 | 0 | 0 | 0.05 | 0 | 0.006 |

The criticality calculator block 212 may perform service criticality score calculation 230, in which a respective criticality score is assigned to each of the services 320a-320o of which the application 180 is composed. According to various aspects described herein, the criticality calculator block 212 may calculate a respective criticality score for one of the services 320a-320o using the forecasted trace distribution, and the criticality calculator block 212 may store the calculated criticality score in memory with information indicating an association with the one of the services (e.g., a pointer, link, metadata, etc.).

According to some aspects of the present disclosure, the criticality calculator block 212 may calculate a criticality score for one of the services 320a-320o based on the number of the execution paths 310a-310g that include the service, the total number of execution paths for all services 320a-320o of the application 180, and the forecasted trace distributions across the execution paths 310a-310g of the service. The criticality calculator block 212 may calculate the criticality score for each of the services 320a-320o according to the following equation:

$$\text{Criticality Score} = \left(\frac{\text{Paths}_{service}}{\text{Paths}_{application}}\right)^{\text{Paths}_{service}} \sum_{i=1} \text{forecasted trace distribution}_i$$

In this equation, $\text{Paths}_{service}$ may be equal to the number of execution paths of the service for which the application criticality score is being calculated, whereas $\text{Paths}_{application}$ may be equal to the total number of execution paths 310a-310g of all services 320a-320o of which the application is composed. Further, forecasted trace distribution; may be the trace distribution forecasted for the $i^{th}$ execution path—that is, each of the forecasted trace distribution numbers calculated for a respective execution path of the service may be summed together and multiplied with the quotient of the number of execution paths on which the service is executed divided by the total number execution paths 310a-310g on which any of the services 320a-320o composing the application 180 is executed. Of course, if a service is executed via a single execution path for the application, then the number of execution paths of the service will be equal to one and the criticality score will be based on one forecasted trace distribution.

TABLE 3 illustrates an example of a criticality scores calculated for the services 320a-320o based on the forecasted trace distribution shown in TABLE 2, supra. TABLE 3 is intended to be illustrative, and other values are possible without departing from the scope of the present disclosure, such as when different approaches to calculating criticality scores are used.

TABLE 3

| Service | Name | Paths Forecasted Trace Distribution | Criticality Calculation | Score |
|---|---|---|---|---|
| 320a | API Gateway | {(ID1, 0.028), (ID2, 0.653), (ID3, 0.003), 5} | $\frac{3}{7} \times 0.651$ | 0.279 |
| 320b | Onboarding | {(ID1, 0.028), 1} | $\frac{1}{7} \times 0.028$ | 0.004 |
| 320c | DB RDS | {(ID1, 0.028), (ID3, 0.003), 4} | $\frac{2}{7} \times 0.031$ | 0.013 |
| 320d | Notification | {(ID1, 0.028), (ID5, 0.0), 1} | $\frac{1}{7} \times 0.028$ | 0.004 |
| 320e | Audit | {(ID1, 0.028), 3} | $\frac{2}{7} \times 0.028$ | 0.008 |
| 320f | Data Validation | {(ID2, 0.653), (ID3, 0.003), 4} | $\frac{2}{7} \times 0.656$ | 0.187 |
| 320g | Reporting | {(ID3, 0.003), (ID5, 0.0), (ID7, 0.006), 1} | $\frac{3}{7} \times 0.009$ | 0.001 |
| 320h | Data Processing | {(ID2, 0.62), (ID3, 0.003), (ID4, 0.006), (ID6, 0.347), 5} | $\frac{4}{7} \times 0.976$ | 0.557 |
| 320i | Auth Service | {(ID1, 0.028), (ID2, 0.653), (ID3, 0.003), (ID4, 0.006), (ID5, 0.0), 1} | $\frac{5}{7} \times 0.657$ | 0.469 |
| 320j | Mobile API Gateway | {(ID4, 0.006), 1} | $\frac{1}{7} \times 0.1$ | 0.0 |
| 320k | SFTP | {(ID5, 0.0), 1} | $\frac{1}{7} \times 0.0$ | 0.0 |
| 320m | Scheduler | {(ID6, 0.347), 1} | $\frac{1}{7} \times 0.347$ | 0.049 |
| 320n | Payment | {(ID2, 0.653), 1} | $\frac{1}{7} \times 0.653$ | 0.093 |
| 320o | Invoice Generator | {(ID2, 0.653), 1} | $\frac{1}{7} \times 0.653$ | 0.093 |

Each criticality score may represent (e.g., estimate, approximate, etc.) the relative effect on or importance of an associated service in providing or maintaining seamless, robust, user-friendly, and/or otherwise acceptable functionality of the comprehensive application 180, for example, in the context (e.g., business context) relevant to the application functionality.

In some aspects, the recommendation block 214 may be configured to perform criticality score-based clustering 232, in which services 320a-320o are clustered in groups based on respective criticality scores. For example, the recommendation block 214 may be configured to sort or group the services 320a-320o into respective groups based on the assigned criticality scores. Thus, services 320a-320o may be clustered based on the respective criticality scores.

The groups may be statically or dynamically defined. In some aspects, the recommendation block 214 may be configured to adjust the ranges of one or more groups, e.g., based on the calculation of the criticality scores. Thus, the groups may be periodically adapted over time so that services 320a-320o may be assigned to groups including other services having similar criticality scores, and may be reassigned to groups as the criticality scores change over time.

The services 320a-320o may be sorted into groups according to various different approaches, such as by quantizing the criticality scores or comparing the criticality scores to thresholds so that services are grouped together according to their priorities. Accordingly, events from similarly situated services may be similarly processed, as described herein.

In one illustrative example, machine language clustering, such as k-means clustering, may be used to sort the services 320a-320o into groups. For example, the recommendation block 214 may implement criticality score-based clustering 232 using k-means clustering. In one illustrative and non-limiting example, the recommendation block 214 may set k equal to 3. The recommendation block 214 may calculate a first centroid that is equal to 0.435, a second centroid that is equal to 0.118, and a third centroid that is equal to 0.008. The first centroid may be associated with a greater criticality or higher priority than the second and third centroids.

According to such k-means clustering, the recommendation block 214 may determine that the criticality scores 0.279 (for Auth Service 320i), 0.557 (for API Gateway Service 320a), and 0.469 (for Data Processing Service 320h) are to be clustered based on the first centroid 0.435. The services having the criticality scores clustered around the first centroid 0.435 may be associated with a greater criticality or higher priority relative to other services in a certain context that is indicated by the preceding trace distribution time series and forecasted trace distribution. For example, the Auth Service 320i, API Gateway Service 320a, and Data Processing Service 320h may be regarded as having a greater criticality or higher priority relative to other services.

Further, the recommendation block 214 may determine that the criticality scores 0.178 (for Data Validation Service 320f) and 0.088 (for Payment Service 320n and Invoice Generator Service 320o) are to be clustered based on the second centroid 0.118. The services having the criticality scores clustered around the second centroid 0.118 may be associated with a lower criticality or lower priority than those services clustered around the first centroid 0.435, but may be associated with a greater criticality or higher priority than those services clustered around the third centroid 0.008.

Similar to the clustering around the first and second centroids, the recommendation block 214 may determine that the criticality scores 0.013 (for DB RDS 320c), 0.008 (for Audit Service 320e), 0.049 (for Scheduler Service 320m), 0.001 (for Reporting Service 320g), 0.004 (for Onboarding Service 320b and Notification Service 320d), and 0 (for Mobile API Gateway Service 320j and SFTP Service 320k) are to be clustered around the third centroid 0.008. The services having the criticality scores clustered around the third centroid 0.008 may be associated with the lowest criticality or lowest priority relative to those services clustered around the first centroid 0.435 and the second centroid 0.118.

In some aspects, the recommendation block 214 may periodically reevaluate the groupings, such as when a trace distribution time series is periodically reevaluated and/or another trace distribution is periodically forecasted (e.g., at the close of a window). In so doing, the recommendation block 214 may recalculate the value of k for k-means clustering and/or recalculate the centroid values around which criticality scores are clustered. Thus, services may be dynamically moved between groups having different criticalities or priorities.

In some instances, one or more of the services 320a-320o may trigger an event during execution. Some examples of events may include at least one of a notification or alert configured to be output, an entry configured to be written to a log, an error or exception report, or an interrupt configured to pause the application for which the service is executed. The event handling block 216 may be configured to receive (e.g., catch, intercept, etc.) the event, and the event handling block 216 may perform criticality score-based event handling 234 in response to receiving the event. In particular, the event handling block 216 may handle the event based on the criticality score associated with the service for which the event was triggered.

Upon receiving an event, the event handling block 216 may evaluate the criticality score associated with the service that triggered the event during execution. Illustratively, the event handling block 216 may detect an event triggered during execution of one of the services 320a-320o for the application 180, and the event handling block 216 may determine whether the service that triggered the event is assigned a criticality score that is sufficiently high enough that the event should be allowed. In some aspects, the event handling block 216 may evaluate the criticality score assigned to that service in order to determine a suitable manner in which to handle or process the event, e.g., in the context relevant to the application 180. For example, the event handling block 216 may compare the criticality score to a threshold or the event handling block 216 may determine whether the service is sorted into a group associated with a greater criticality than other groups.

If the event handling block 216 determines that the criticality score satisfies (e.g., meets or exceeds) the threshold or the event handling block 216 determines that the service is assigned to a group having a sufficiently high criticality, then the event handling block 216 may determine that the event should be conventionally processed, e.g., without intervention by the event handling block 216. For example, the event may be a notification that is output (e.g., displayed) on a device at the computing system (e.g., an orchestrator), at a client device (e.g., an end-user device), and/or at another device, the event may be an error, or the event may be an entry to be logged.

However, if the event handling block 216 determines that the criticality score does not satisfy (e.g., fails to meet or fails to exceed) a certain threshold or the event handling block 216 determines that the service is assigned to a group having a lower criticality, then the event handling block 216 may determine that the event should be differently processed, e.g., with intervention by the event handling block 216. For example, the event handling block 216 may suppress the event, such as by preventing a notification from being output (e.g., displayed) on a device, the event handling block 216 may suppress an error or exception, or the event handling block 216 may suppress an entry from being logged.

Figure 5A:
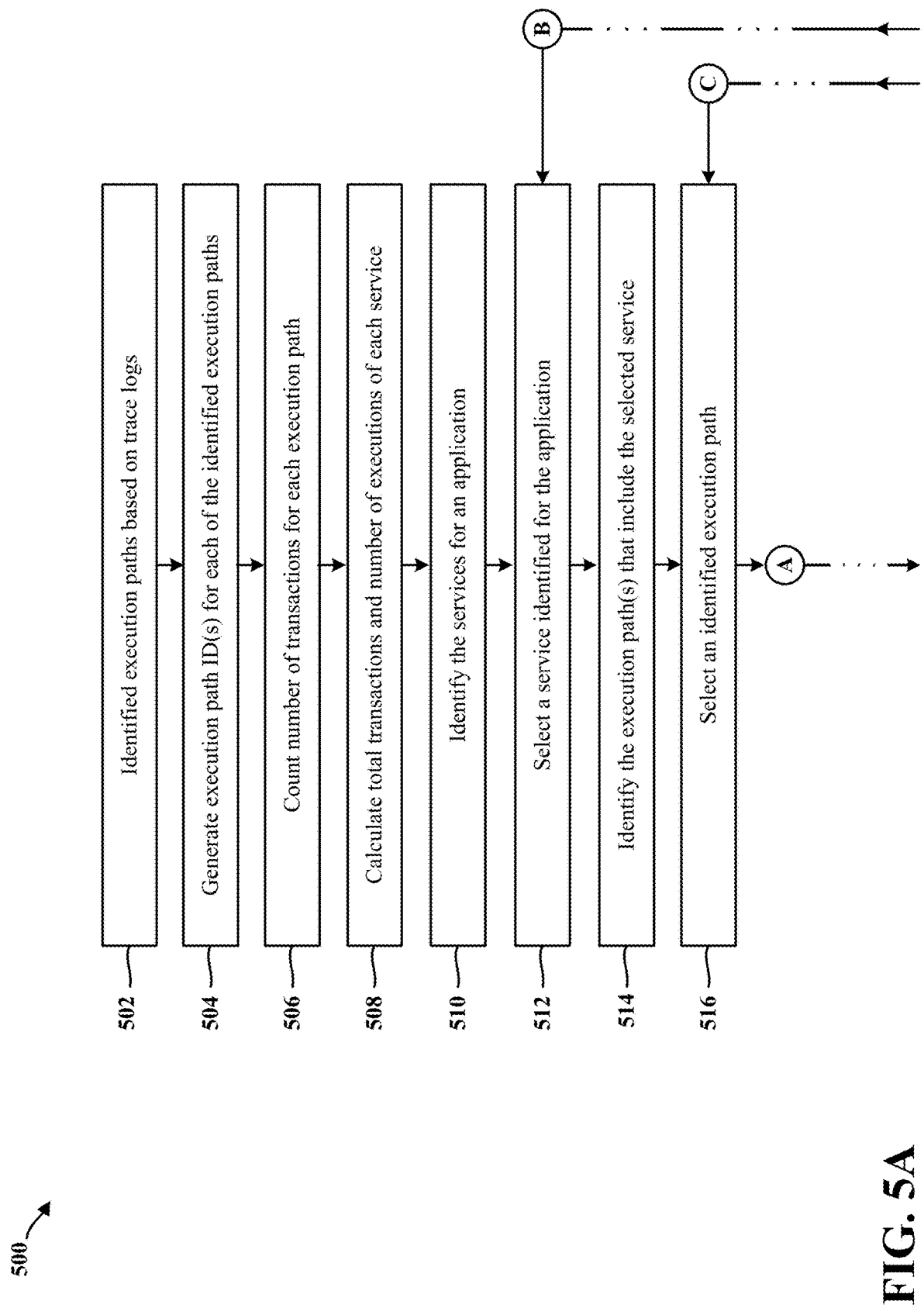
FIGS. 5A and 5B illustrate a flowchart of an example method of assigning a criticality score to services of one or more applications implemented with an MSA or other SBA.
Figure 5B:
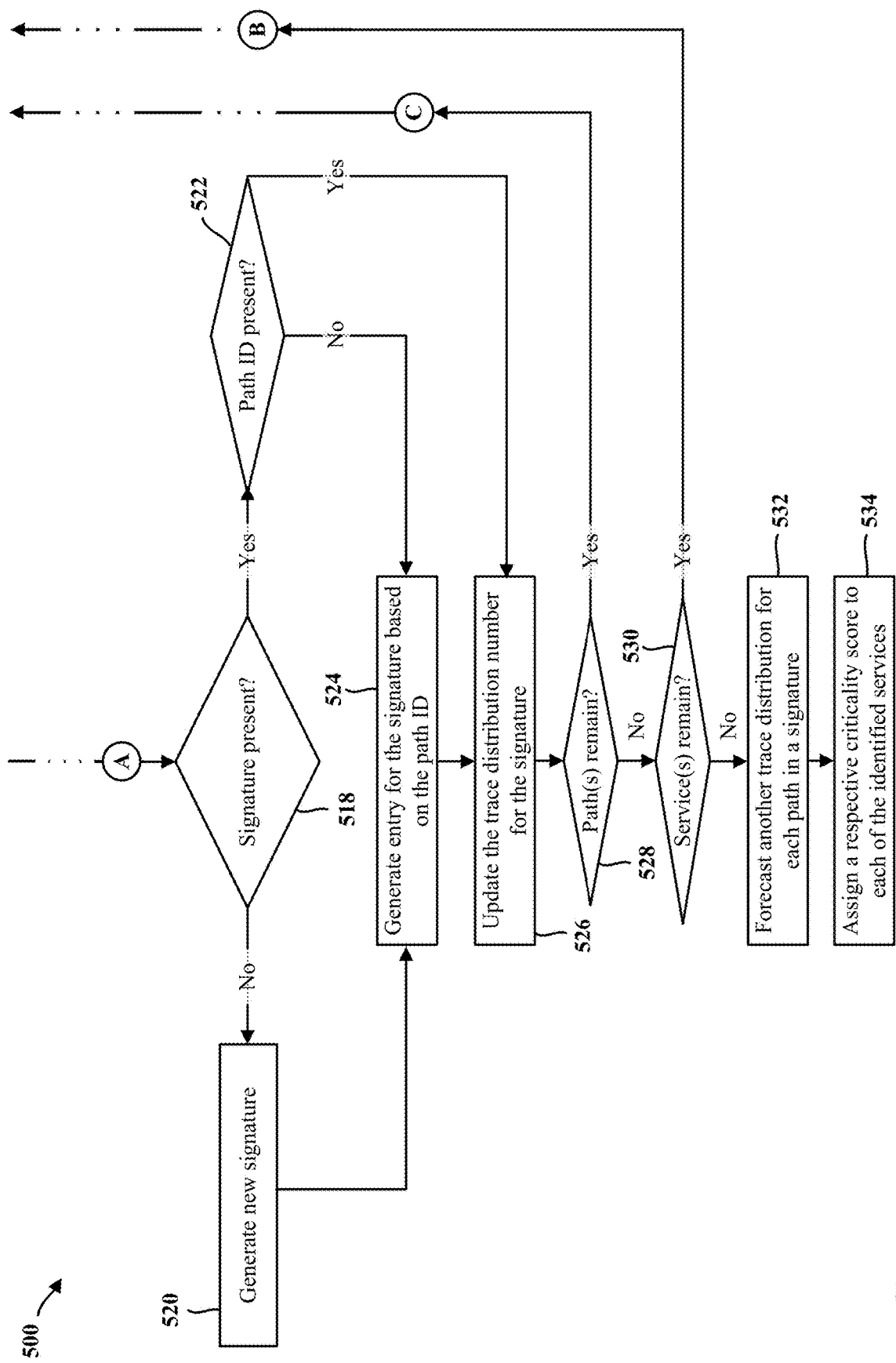

FIGS. 5A and 5B illustrate a flowchart 500 of an example method of assigning a criticality score to services of an application for managing events triggered during executions of the services. The method may be performed by a computing system or other apparatus or a component thereof, such as the orchestrator 102 of FIG. 1 or the apparatus 702 of FIG. 7. According to various different aspects, one or more of the illustrated blocks may be omitted, transposed, and/or contemporaneously performed.

At 502, the computing system may identify execution paths based on trace logs. For example, the computing system may access a database in which log files are stored, and the computing system may retrieve information indicating the messages across a set of services that resulted from a transaction associated with application functionality. The computing system may use such information to identify execution paths by following the messages that originated with one or more requests associated with the application functionality. For example, the computing system may trace a transaction using messages from the root application to each services that is directly or indirectly executed to accomplish the functionality of the transaction. Accordingly, the computing system may trace multiple branches from multiple different services.

For example, in the context of FIGS. 1-3, the orchestrator 102 may identify execution paths 310a-310g having ID1 through ID7 based on log files retrieved from the trace storage 206.

In some aspects, the computing system may identify execution paths as a hierarchy or tree structure with the application serving as the root, and messages defining the branches connecting the services, which may be viewed as the nodes. According to such an approach, the services that are terminal points and/or are not composed of other services may be considered leaves.

In some further aspects, the computing system may identify paths based on some supplementary information, such as some contextual information associated with the transaction (e.g., location from which the transaction originated, demographic of user from which the transaction originated, etc.). For example, the computing system may tag an execution path with contextual information, which potentially may result in duplicate execution paths being identified, although the execution paths may be distinguishable based on variations between the contextual information with which each of the paths are tagged.

At 504, the computing system may generate execution path IDs for each of the identified execution paths. For example, the computing system may generate a unique value for each unique execution path, and the computing system may store the unique value with information indicating the association to the corresponding unique execution path.

For example, in the context of FIGS. 1 and 3, the orchestrator 102 may generate the execution path IDs ID1 through ID7 to uniquely identify the execution paths 310a-310g, respectively.

In some further aspects, the computing system may generate execution path IDs for each of the identified execution paths based on some supplementary information, such as some contextual information associated with the transaction (e.g., location from which the transaction originated, demographic of user from which the transaction originated, etc.). For example, the computing system may tag an execution path with contextual information, which may result in duplicate execution paths being uniquely identifiable based on variations between the contextual information with which each of the paths are tagged. For example, in the context of FIG. 3, the execution path 310d from Mobile API Gateway 320g, File Uploader 320l, and Data Processing 320i may be identified as ID4 when the transaction originated from a California location, but may be identified as ID8 when the transaction originated from a New York location. At 506, the computing system may count the number of transactions for each execution path. For example, the computing system may select all the transactions having respective times that fall within one or more time periods (e.g., time periods $P_1$, $P_2, \ldots, P_n$), and then the computing system may increment a respective counter value corresponding to one of the execution paths for each transaction along that execution path. In some aspects, the computing system may count the number of transactions for each execution path across each instance of an application. In some other aspects, the computing system may count the number of transactions for each execution path across all instances of all applications.

For example, in the context of FIGS. 1-3, the orchestrator 102 may count the number of transactions for each of the execution paths 310a-310g ID1 through ID7 based on trace log files retrieved from the trace storage 206 indicating traces over one or more time periods (e.g., time periods $P_1$, $P_2, \ldots, P_n$).

At 508, the computing system may calculate the total transactions and the number of instances of each service. For example, the computing system may add together each of the counter values in order to obtain the total transactions that occurred over the one or more time periods (e.g., time periods $P_1, P_2, \ldots, P_n$). Additionally, the computing system may, for each one of the services, add together each of the counter values of counters corresponding to execution paths that includes that one of the services.

For example, in the context of FIGS. 1 and 3, the orchestrator 102 may count the number of total transactions across all of the execution paths 310a-310g ID1 through ID7 over one or more time periods (e.g., time periods $P_1$, $P_2, \ldots, P_n$), such as by calculating the total number of transactions over all of the execution paths beginning at the start of a time period and concluding at the end of the time period. Further, the orchestrator 102 may, for each one of the services 320a-320o, add together the number of transactions issued on all of the execution paths that include the one service.

At 510, the computing system may identify the services of which an application is composed. For example, the computing system may select each of the transactions traced for the application, and the computing system may identify the services executed according to each of the transactions traced for the application. The computing system may eliminate duplicate services, so that each service of which the application is composed is uniquely identified.

For example, in the context of FIGS. 1 and 3, the orchestrator 102 may identify each of the unique services 320a-320o of which an application is composed.

At 512, the computing system may select one of the services of which the application is composed. For example, the computing system may iterate through a list (e.g., an array, a linked list, another sequential data structure, etc.), with each individual list entry being a respective one of the services enumerated for the application. The computing system may begin with a pointer or index into the list at a default position or initial value (e.g., zero or one), and the computing system may advance through the list by sequentially moving the pointer or index to the next list entry (e.g., increment the index by one, move another service sequentially represented as the next list entry, etc.) at the point(s) block 512 is reached (e.g., from block 530, discussed infra). Accordingly, the computing system may select the service at the list position corresponding to the pointer position, index value, etc.

For example, in the context of FIGS. 1 and 3, the orchestrator 102 may iteratively chat with each one of the services 320a-320o composing the application. Illustratively, the orchestrator 102 may select API Gateway Service 320a when the pointer or index into the list is at a default position or initial value.

At 514, the computing system may identify the execution paths that include the selected service. For example, for each one of the execution paths, the computing system may compare the selected service with each of the services included in a respective execution path. If the computing system finds that the selected service matches one of the services included in the respective execution path, then the computing system may add the execution path to a list of execution paths that include the selected service.

For example, in the context of FIGS. 1 and 3, the orchestrator 102 may identify the execution paths that include the selected one of the services 320a-320o. Illustratively, the orchestrator 102 may select API Gateway Service 320a, and accordingly, the orchestrator 102 may identify the execution paths 310a-310c, assigned ID1, ID2, and ID3.

At 516, the computing system may select one of the execution paths identified as including the selected service. For example, the computing system may iterate through a list (e.g., an array, a linked list, another sequential data structure, etc.), with each individual list entry being a respective one of the execution paths identified as belonging to the service. The computing system may begin with a pointer or index into the list at a default position or initial value (e.g., zero or one), and the computing system may advance through the list by sequentially moving the pointer or index to the next list entry (e.g., increment the index by one, move to the execution path sequentially represented as the next list entry, etc.) at each point the computing system is configured to select one of the execution paths identified for the selected service (e.g., at the point(s) block 516 is reached, such as from block 528, discussed infra). Accordingly, the computing system may select the execution path stored in the list position corresponding to the pointer position, index value, etc.

For example, in the context of FIGS. 1 and 3, the orchestrator 102 may select one of the execution paths 310a-310g that includes the selected one of the services 320a-320o. Illustratively, when API Gateway Service 320a is selected, the orchestrator 102 may initially select the execution path 310a having ID1 according to the pointer or index into the list being at a default position or initial value.

At 518, the computing system may determine whether a signature exists for the selected service. For example, the computing system may compare information uniquely identifying the selected service with at least one value of at least one field or property of at least one instance or object of a service signature type or class—e.g., the at least one field or property may be configured to be set to at least one value uniquely identifying the service corresponding to the signature. In some aspects, the information uniquely identifying the selected service may include an alphanumeric string and/or tag.

If the computing system finds an object or instance of the service signature type or class having at least one field or property set to at least one value that matches the information uniquely identifying the selected service, then the computing system may determine that a signature exists for the selected service. However, if the computing system fails to find an object or instance of the service signature type or class having at least one field or property set to at least one value that matches the information uniquely identifying the selected service, then the computing system may determine that a signature for the selected service is nonexistent.

For example, in the context of FIGS. 1, 3 and 4, the orchestrator 102 may determine whether a signature 420 exists for the selected one of the services 320a-320o. Illustratively, when API Gateway Service 320a is selected, the orchestrator 102 may find a signature 420 exists for API Gateway Service 320*a* if an instance or object of the signature type or class (e.g., similar to the signature 420) has already been generated and assigned to API Gateway Service 320*a*. However, the orchestrator 102 may find that a signature 420 is nonexistent for API Gateway Service 320*a* when the instance or object of the signature type or class is nonexistent for API Gateway Service 320*a*.

If, at 518, the computing system determines that a signature is nonexistent for the selected one of the services, then the computing system may:

At 520, the computing system may generate a new signature for the selected one of the services if the computing system determines that a signature is nonexistent for the selected one of the services. For example, the computing system may create a new instance or new object of a service signature type or class, and the computing system may configure one or more variables of the service signature type or class to be equal to the name or label of the selected service. The computing system may store, in memory, the new instance or new object of the service signature type or class for the selected one of the services.

For example, in the context of FIGS. 1, 3 and 4, the orchestrator 102 may generate an instance or object of the signature 420 type or class when the orchestrator 102 determines that an instance or object of the signature type or class does not exist for the selected one of the services 320*a*-320*o*. Illustratively, when API Gateway Service 320*a* is selected and the orchestrator 102 determines that a signature 420 is nonexistent for API Gateway Service 320*a*, the orchestrator 102 may create an instance or an object of the signature type or class for API Gateway Service 320*a*. The service name 422 of the instance or object may be set to "API Gateway" or other information uniquely distinguishing the instance or object from other instances or objects stored in memory.

If, at 518, the computing system determines that a signature exists for the selected one of the services, then the computing system may:

At 522, the computing system may determine whether the existing signature for the selected one of the services includes an identifier identifying the selected one of the execution paths if the computing system determines that a signature is exists for the selected one of the services. For example, the computing system may iterate through a list (e.g., an array, a linked list, another sequential data structure, etc.), with each individual list entry being a respective one of the execution paths enumerated in the signature corresponding to the selected service. The computing system may begin with a pointer or index into the list at a default position or initial value (e.g., zero or one), and the computing system may advance through the list by sequentially moving the pointer or index to the next list entry (e.g., increment the index by one, move to the execution path identifier sequentially represented as the next list entry, etc.), comparing an identifier of the selected execution path with another identifier of the one of the execution paths referenced at the current pointer position or index value.

If the identifier of the selected execution path matches the other identifier represented in the signature at the current pointer position or index value, then the computing system may determine that an identifier for the selected one of the execution paths exists in the existing signature corresponding to the selected service. If, however, the identifier of the selected execution path does not match the other identifier represented in the signature, then computing system may advance the current pointer position or index value into the list to the next sequential pointer position or index value for another comparison. If the computing system reaches the end of the list without finding a match between the identifier of the selected one of the execution paths and any of the identifiers of the execution paths represented in the signature, then the computing system may determine that the selected one of the execution paths is nonexistent in the signature for the selected one of the services.

For example, in the context of FIGS. 1, 3 and 4, the orchestrator 102 may determine whether the existing signature for the selected one of the services 320*a*-320*o* includes an identifier identifying the selected one of the execution paths 310*a*-310*g* if the computing system determines that a signature is exists for the selected one of the services. Illustratively, the orchestrator 102 may determine whether the existing signature 442 for API Gateway Service 320*a* includes an identifier identifying the selected execution path. Further to such an illustratively scenario, the orchestrator 102 may determine whether the list of execution path identifiers 424 in the signature 442 for API Gateway Service 320*a* includes the execution path 310*a* having ID1.

If: (1) at 518, the computing system determines that a signature is nonexistent for the selected one of the services and, at 520, the computing system generates a new signature for the selected one of the services; or (2) at 522, the computing system determines an existing signature for the selected one of the services does not include an identifier identifying the selected one of the execution paths, then:

At 524, the computing system may generate an entry for the signature based on the execution path identifier. For example, the computing system may update a field or property of the signature that includes a list of the execution path(s) from which the selected one of the services is invoked—e.g., the computing system may append an identifier of the execution path to a list of execution path identifiers associated with the selected one of the services, or the computing device may initialize a new instance of a tuple data structure and set at least one of the elements (e.g., the first element) to include the execution path identifier. The computing system may store the updated signature in memory as an updated instance or object of the signature type or class.

For example, in the context of FIGS. 1, 3 and 4, the orchestrator 102 may generate an entry 428 for the signature 420 based on an identifier of the selected one of the execution paths 310*a*-310*g* corresponding to the selected one of the services 320*a*-320*o*. The entry 428 may include two or more elements, with one element being configured to hold the execution path identifier 424 of the selected one of the execution paths 310*a*-310*g* corresponding to the selected one of the services 320*a*-320*o*, and the other element being configured to hold a trace or transaction distribution time series 426. Illustratively, the orchestrator 102 may generate an entry indicating the value ID1 for the signature 442 of API Gateway Service 320*a* based on the identifier ID1 of the first execution path 310*a*.

If: (1) at 524, the computing system generates an entry for the service signature based on the execution path identifier corresponding to the selected execution path of the selected service; or (2) at 522, the computing system determines an existing signature for the selected one of the services includes an identifier identifying the selected one of the execution paths, then:

At 526, the computing system may update a trace distribution number of executions of the service set for the signature. For example, the computing system may discover transactions issued for the application that trace the selected execution path. In some aspects, the computing system may discover the application transactions that trace the selected execution path over one or more time periods, such as time periods $P_1, P_2, \ldots, P_n$. Potentially, the computing system may discover all transactions for every instance of the application that trace the selected execution path.

The computing system may calculate a sum by counting the discovered transactions that trace the selected execution path for the application, and then the computing system may update the trace distribution number of executions of the service signature with the calculated sum. For example, the computing system may update a field or property of the service signature that corresponds to the trace distribution number of executions—e.g., the computing system may set at least one element (e.g., the second element) of a tuple data structure to include the updated trace distribution number of executions (e.g., the calculated sum). The computing system may store the updated signature in memory as an updated instance or object of the signature type or class.

In an illustrative example, given a first service included in a first execution path having a time series trace distribution of 45 transactions in a first time period $P_1$ having 100 total transactions, 33 transactions in a second time periods $P_2$ having 50 total transactions, 56 transactions in a third time period $P_3$ having 56 total transactions, 40 transactions in a fourth time period $P_4$ having 80 total transactions, 0 transactions in a fifth time period $P_5$ having 100 total transactions, and 20 transactions in a sixth time period $P_6$ having 200 total transactions, the computing system may configure a signature for the first service to indicate the time series trace distribution data points $\{(P_1, 45), (P_2, 33), (P_3, 56), (P_4, 40), (P_5, 0), (P_6, 20)\}$ or $\{(P_1, 0.45), (P_2, 0.66), (P_3, 1), (P_4, 0.5), (P_5, 0), (P_6, 0.1)\}$, as well as the time series total transactions data points $\{(P_1, 100), (P_2, 50), (P_3, 56), (P_4, 80), (P_5, 100), (P_6, 200)\}$. Further to such an example, given the first service is additionally included in a second execution path having a time series trace distribution of 0 transactions in the first time period $P_1$, 0 transactions in the second time period $P_2$, 0 transactions in the third time period $P_3$, 40 transactions in the fourth time period $P_4$, 90 transactions in the fifth time period $P_5$, and 30 transactions in the sixth time period $P_6$, the computing system may additionally configure the signature of the first service to indicate the data points $\{(P), 0), (P_2, 0), (P_3, 0), (P_4, 40), (P_5, 90), (P_6, 30)\}$ or $\{(P_1, 0), (P_2, 0), (P_3, 0), (P_4, 0.5), (P_5, 0.9), (P_6, 0.15)\}$.

For example, in the context of FIGS. 1, 3 and 4, the orchestrator 102 may update the transaction distribution time series 426 of an entry 428 in the signature 420 corresponding to the selected one of the execution paths 310a-310g. Illustratively, the orchestrator 102 may update an element of an entry of the signature 442 of API Gateway Service 320a corresponding to the first execution path 310a having ID1 with a respective number of transactions that trace the first execution path 310a over each of set of time periods, which may begin with a first time period (e.g., $P_1$) and conclude with a second time period (e.g., a most recent time period, such as time period $P_n$).

At 528, the computing system may determine whether any execution paths remain to be iterated through for the selected service. For example, the computing system may retrieve a pointer position or index value used as an index into a list of the execution paths for the selected service. The current pointer position or index value may refer to the most recently selected list entry, which may represent the most recently selected execution path. The computing system may advance to the next list entry of the list of execution paths including the selected service, for example, by advancing the pointer from the current position to the next sequential position or incrementing the index from the current value to the next sequential value.

The computing system may select the next execution path from the list of execution paths identified for the selected service according to the list entry to which the advanced pointer position or incremented index value refers. That is, when at least one further execution path remains in the list of execution paths identified for the selected service, the method may return to block 516 and resume as described supra.

However, if most recently selected execution path is the last execution path to be selected for the selected service, the computing system may determine that no further execution paths for the selected service remain, and therefore, iteration through the execution paths identified for the selected service is complete. For example, if the computing system determines that advancing the pointer position or index value would reference a null list entry or would exceed a boundary of the list of execution paths identified for the selected service, the computing system may determine the no further identified execution paths remain for the selected service. That is, when at least no further execution paths remain in the list of execution paths identified for the selected service, the method may proceed to block 530 as described infra.

For example, in the context of FIGS. 1, 3, and 4, the orchestrator 102 may determine whether any of the execution paths 310a-310g identified for the selected one of the services 320a-320o remains to be iterated through in order to generate and/or update a signature 420 for the selected one of the services 320a-320o. Illustratively, where the first execution path 310a is most recently selected, the orchestrator 102 may determine that at least one other execution path identified for API Gateway Service 320a remains. Therefore, the orchestrator 102 may advance a pointer position or index value to the second execution path 310b with ID2, as the second execution path 310b may sequentially follow the first execution path 310a in a list of execution paths identified for API Gateway Service 320a. According to another illustration, where the orchestrator 102 has already iterated through the first, second, and third execution paths 310a-310c and the third execution path 310c with ID3 is most recently selected, the orchestrator 102 may determine that no further execution paths remain, as there are no further list entries that can be sequentially referenced following the iteration through the first, second, and third execution paths 310a-310c.

At 530, the computing system may determine whether any services composing the application remain, e.g., upon determining that no further execution paths remain for the most recently selected service. For example, the computing system may retrieve a pointer position or index value used as an index into a list of the services composing the application. The current pointer position or index value may refer to the most recently selected list entry, which may represent the most recently selected service. The computing system may advance to the next list entry of the list of services composing the application, for example, by advancing the pointer from the current position to the next sequential position or incrementing the index from the current value to the next sequential value.

The computing system may select the next service from the list of services composing the application according to the list entry to which the advanced pointer position or incremented index value refers. That is, when at least one further service remains in the list of services composing the application, the method may return to block 512 and resume as described supra.

However, if most recently selected service is the last service to be selected for the application, the computing system may determine that no further services composing the application remain, and therefore, iteration through the services composing the application is complete. For example, if the computing system determines that advancing the pointer position or index value would reference a null list entry or would exceed a boundary of the list of services composing the application, the computing system may determine the no further services composing the application remain. That is, when at least no further services remain in the list of services composing the application, the method may proceed to block 532 as described infra.

For example, in the context of FIGS. 1, 3, and 4, the orchestrator 102 may determine whether any of the services 320a-320o composing the application 180 remain to be iterated through in order to generate and/or update a signature 420 for each of the services 320a-320o. Illustratively, where API Gateway Service 320a is most recently selected, the orchestrator 102 may determine that at least one other service composing the application 180 remains. Therefore, the orchestrator 102 may advance a pointer position or index value to Onboarding 320b, as Onboarding 320b may sequentially follow API Gateway Service 320a in a list of services composing the application 180. According to another illustration, where the orchestrator 102 has already iterated through the services 320a-320o and Invoice Generator 320o is most recently selected, the orchestrator 102 may determine that no further services remain, as there are no further list entries that can be sequentially referenced following the iteration through the services 320a-320o.

At 532, the computing system may forecast a trace distribution for each path of each service composing the application. In some aspects, the computing system may forecast a trace distribution for each of the execution paths that include each of the services composing the application by forecasting, for each execution path, a respective trace distribution to be approximately or equal to a respective trace distribution number corresponding to an execution path over a most recent time period $P_n$ (e.g., from a set of time periods $P_1, P_2, \ldots, P_n$). To that end the computing system may first determine the number of transactions tracing an execution path over the most recent time period $P_n$—e.g., the computing system may calculate the sum of the number of transactions issued for the application that traced the execution path. The computing system may calculate the number of transactions issued for each instance of the application that traced the execution path, which may include multiple instances of the application and potentially at separate locations.

In addition, the computing system may calculate the number of transactions issued for the application (e.g., regardless of the execution path that is traced according to the transaction) over the most recent time period $P_n$. That is, the computing system may count up the total number of transactions originating for every instance of the application over the most recent time period $P_n$. The computing system may then calculate the trace distribution number for the execution path as the quotient of the number of transactions tracing the execution path associated with the application divided by the total number of transactions tracing every execution path associated with the application over the most recent time period $P_n$. Effectively, the calculated trace distribution number, which may correspond to a most recent time period $P_n$ over which transactions for the application were collected and/or traced, may be used as an approach to forecasting traces for the application. Potentially, this approach may be less resource intensive and/or may reduce the duration experienced while some or all of the abovementioned statistics are calculated.

In some other aspects, the computing system may forecast a trace distribution for another time period based on previously observed trace distribution numbers. For example, the computing system may forecast a trace distribution for the current time period or the next consecutive time period (e.g., time period $P_{n+1}$) based on a sequence of preceding time periods (e.g., time periods $P_1, P_2, \ldots, P_n$). The computing system may forecast the trace distribution according to the relative frequency with which each execution path is traced over one or more preceding time periods (e.g., time periods $P_1, P_2, \ldots, P_n$).

In some examples, for each execution path, the computing system may count a respective number of transactions in each of the one or more preceding time periods that trace the execution path. Further, the computing system may count the total number of transactions in each of the one or more preceding time periods—e.g., the computing system may count the number of every transaction in each of the one or more time periods that traces an execution path of any service that composes the application. For each execution path, the computing system may calculate the fractional amount of the total number of transactions in each of the one or more time periods that trace the execution path. For example, given a dataset showing 100 total transactions with 45 transactions tracing a first execution path in a first time period $P_1$, 50 total transactions with 33 transactions tracing the first execution path in a second time period $P_2$, 56 total transactions with 56 transactions tracing the first execution path in a third time period $P_3$, 80 total transactions with 40 transactions tracing the first execution path in a fourth time period $P_4$, 100 total transactions with 0 transactions tracing the first execution path in a fifth time period $P_5$, and 200 total transactions with 20 transactions tracing the first execution path in a sixth time period $P_6$, the computing system may calculate the trace distribution numbers of the first execution path to be $45 \div 100 = 0.45$ in the first time period $P_1$, $33 \div 50 = 0.66$ in the second time period $P_2$, $56 \div 56 = 1$ in the third time period $P_3$, $40 \div 80 = 0.5$ in the fourth time period $P_4$, $0 \div 100 = 0$ in the fifth time period $P_5$, and $20 \div 200 = 0.1$ in the sixth time period $P_6$.

The computing system may then forecast the trace distribution in another time period (e.g., the current time period or the next consecutive time period) by fitting the calculated trace distribution numbers onto a time series forecasting model. The time series forecasting model may be any suitable model onto which time series data points may be fitted. For example, the time series forecasting model may be an autoregressive model, a moving average model, an autoregressive moving average model, an autoregressive integrated moving average model, an exponential smoothing model, or another forecasting model or combination of forecasting models. Potentially, the time series forecasting model may include one or more weights, constants, coefficients, orders, and/or other variables to suitably weight or otherwise improve the accuracy of forecasting the time series trace distribution of the other time period. Illustratively, given the abovementioned time series trace distribution of the first execution path, the computing system may fit the data points $\{(P_1, 0.45), (P_2, 0.66), (P_3, 1), (P_4, 0.5), (P_5, 0), (P_6, 0.1)\}$ to a time series forecasting model, and based thereon, the computing system may forecast a trace distribution of the first execution path in the next time period $P_7$ to be 0.028, which may be a found as the forecasted data point ($P_7$, 0.028).

In some aspects, the computing system may configure a respective signature of each service to indicate the forecasted trace distribution data points of each execution path that includes the service. For example, if the first service is included in the first execution path having a forecasted time series trace distribution of 0.028 in the next time period $P_7$, and included in the second execution path having a forecasted time series trace distribution of 0.653 in the next time period $P_7$, the computing system may configured the signature of the first service to indicate the data points ($P_7$, 0.028) for the first execution path and ($P_7$, 0.653) for the second execution path.

For example, in the context of FIGS. 1, 3, and 4, the orchestrator 102 may forecast a trace distribution for each of the path 310a-320g of the services 320a-320o composing the application 180. Illustratively, for the API Gateway Service 320a included in the first (ID1) execution path 310a, the second (ID2) execution path 310b, and the third (ID3) execution path 310c, the orchestrator 102 may forecast the time series trace distributions in another time period as 0.028, 0.653, and 0.003, respectively. The orchestrator 102 may forecast a trace distribution for each path of each service composing the application using the signature 420 of the service, which may include at least one entry 428 indicating an execution path identifier 424 of an execution path including the service and the associated trace distribution time series 426 of the execution path, as well as the time series 430 of the number of executions of the service (e.g., the time series of the total number of transactions tracing the at least one execution path of the service).

At 534, the computing system may assign a respective criticality score to each of the identified services of which the application is composed. For example, the computing system may calculate a respective criticality score for one of the services using the forecasted trace distribution, and the computing system may store the calculated criticality score in memory with information indicating an association with the one of the services (e.g., a pointer, link, metadata, etc.).

Each criticality score may represent (e.g., estimate, approximate, etc.) the relative effect on or importance of an associated service in providing or maintaining seamless, robust, user-friendly, and/or otherwise acceptable functionality of the comprehensive application, for example, in the context (e.g., business context) relevant to the application functionality. As described, supra, for example, the computing system may evaluate a criticality score associated with execution of a service included in the application composition upon detecting an event triggered by the execution of the service for the application.

Illustratively, the computing system may detect a notification event triggered during execution of one of the services for the application, and the computing system may evaluate the criticality score assigned to that service in order to determine a suitable manner in which to handle or process the notification event, e.g., in the context relevant to the application. For example, the computing system may compare the criticality score to a threshold. If the computing system determines that the criticality score satisfies (e.g., meets or exceeds) the threshold, then the computing system may determine that the notification event relates to a service that is relatively more important to the application functionality, and therefore, should be output (e.g., displayed) on a device at the computing system (e.g., an orchestrator), at a client device (e.g., an end-user device), and/or at another device.

According to some aspects of the present disclosure, the computing system may calculate a criticality score for one of the services based on the number of execution paths that include the service, the total number of execution paths for all services of the application, and the forecasted trace distributions across the execution paths of the service. The computing system may calculate the criticality score for one of the services according to the following equation:

$$\text{Criticality Score} = \left(\frac{\text{Paths}_{service}}{\text{Paths}_{application}}\right)^{\text{Paths}_{service}} \sum_{i=1}^{\text{Paths}_{service}} \text{forecasted trace distribution}_i$$

In this equation, $\text{Paths}_{service}$ may be equal to the number of execution paths of the service for which the application criticality score is being calculated, whereas $\text{Paths}_{application}$ may be equal to the total number of execution paths of all services of which the application is composed. Further, forecasted trace distribution; may be the trace distribution forecasted for the $i^{th}$ execution path—that is, each of the forecasted trace distribution numbers calculated for a respective execution path of the service may be summed together and multiplied with the quotient of the number of execution paths on which the service is executed divided by the total number execution paths on which any service composing the application is executed. Of course, if a service is executed via a single execution path for the application, then the number of execution paths of the service will be equal to one and the criticality score will be based on one forecasted trace distribution.

For example, in the context of FIGS. 1, 3, and 4, the orchestrator 102 may assign a respective criticality score to each of the identified services 320a-320o of which the application 180 is composed. Illustratively, the orchestrator 102 may assign a criticality score to the API Gateway Service 320a using the signature 442 of the API Gateway Service 320a.

FIG. 6 illustrates a flowchart 600 of an example method of processing and handling events associated with service dependencies of an application. The method may be performed by a computing system or other apparatus or a component thereof, such as the orchestrator 102 of FIG. 1 or the apparatus 702 of FIG. 7. According to various different aspects, one or more of the illustrated blocks may be omitted, transposed, and/or contemporaneously performed.

At 602, the computing system may identify an execution path of an instruction set based on a set of dependencies associated with the instruction set. In some aspects, the instruction set may be a service of which an application is at least partially composed. The set of dependencies may likewise be services, e.g., upon which the instruction set may depend or which depend upon the instruction set.

In some aspects, the computing system may access a storage device (e.g., a database) to obtain a transaction log in which transactions related to at least the application are recorded. A transaction may indicate a set of direct or indirect calls or invocations triggering execution of one or more instruction sets. For example, a transaction for the application may be directed to an Audit instruction set, thereby triggering execution of the instruction sets of API Gateway, Auth Service, Onboarding, DB RDS, and Notification. An entry (or a set of related entries) in a log file may indicate the date and/or time this execution path was executed. Potentially, the computing system may be configured to trace transactions based on messages passed between instruction sets.

The computing system may then trace the messages related, directly or indirectly, to one transaction, such as by identifying a transaction identifier or other information indicating an association between a transaction and a message. For example, the computing system may retrieve information indicating the messages across a set of services that resulted from a transaction associated with application functionality. The computing system may use such information to identify execution paths by following the messages that originated with one or more transactions (e.g., requests) associated with the application functionality. For example, the computing system may trace a transaction using messages over services beginning with a root or directly called service and tracing messages to each of the services that is directly or indirectly executed to facilitate execution of the root or called service, which may further accomplishment of the application functionality (e.g., business purpose). The computing system may trace multiple branches over multiple different services for a single transaction.

For example, in the context of FIGS. 1-3, the orchestrator 102 may, for one of the services 320a-320o, identify one of the execution paths 310a-310g respectively having one of ID1 through ID7. Illustratively, the orchestrator 102 may access the trace storage 206 in order to obtain transactions over a set of time periods $P_1, P_2, \ldots, P_n$ issued for an application composed of the services 320a-320o. Based on the transactions retrieved from the trace storage 206, the orchestrator 102 may perform trace analysis 222 to identify one of the execution paths 310a-310g that includes the one of the services 320a-320o.

At 604, the computing system may identify one or more other execution paths of the instruction set based on one or more other sets of dependencies associated with the instruction set. As different instruction sets (or services) can be (re)used in different circumstances (e.g., different business contexts and/or for different business purposes), the potential exists for an instruction set to be associated with one or more other sets of dependencies. That is, the instruction set may be included in one or more sets of dependencies triggered for execution of another instruction set and/or the instruction set may include one or more sets of dependencies that are triggered for its own execution. In either instance, different types of transactions may be traced over different execution paths upon which the instruction set may lie. For example, an instruction set of a data processing service may be included in the execution path for another instruction set of a scheduler service while also being included in the execution path for even another instruction set of a reporting service.

Accordingly, the computing system may identify another execution path associated with the instruction set by tracing the messages related, directly or indirectly, to another type of transaction, such as by identifying another transaction identifier or other information indicating an association between the other type of transaction and another message. For example, the computing system may retrieve, from the storage device (e.g., database), other information indicating other messages across another set of services that resulted from the other type of transaction, which may be associated with other application functionality. The computing system may use such information to identify other execution paths that include the instruction set by following the messages that originated with one or more other types of transactions (e.g., requests) associated with other application functionality. For example, the computing system may trace another type of transaction using other messages over services beginning with another root or directly called service and tracing other messages to each of the other services that is directly or indirectly executed to facilitate execution of the other root or called service, which may further accomplishment of the other application functionality (e.g., other business purpose). The computing system may trace multiple other branches over multiple other different services for various other types of transactions.

For example, in the context of FIGS. 1-3, the orchestrator 102 may identify, for the one of the services 320a-320o, another one or more of the execution paths 310a-310g respectively having another one or more of ID1 through ID7 based on another one or more of the services 320a-320o associated with the one of the services 320a-320o. Illustratively, the orchestrator 102 may access the trace storage 206 in order to obtain transactions over a set of time periods $P_1, P_2, \ldots, P_1$ issued for an application composed of the services 320a-320o. Based on the transactions retrieved from the trace storage 206, the orchestrator 102 may perform trace analysis 212 in order to identify other execution path(s) that include the one of the services 320a-320o.

At 606, the computing system may calculate a trace distribution time series based on a number of traces on each execution path of the instruction set and a number of traces on all execution paths of instruction sets of the application at each interval of the time series. The trace distribution time series may be a distribution of execution paths that are traced over a set of time periods $P_1, P_2, \ldots, P_n$. For example, the computing system may select transactions issued for an application over a duration equal (or approximately equal) to the sum of the durations of the set of time periods $P_1, P_2, \ldots, P_n$, or, equivalently:

$$\sum_{i=1}^{n} P_i$$

For each of the time periods $P_1, P_2, \ldots, P_n$, the computing system may count a respective number of traces that occurred over each of the execution paths. In addition, for each of the time periods $P_1, P_2, \ldots, P_n$, the computing system may count the total number of transactions issued for the application. Thus, the computing system may find, in a given time period $P_m$, $1 \leq m \leq n$, the fractional amounts of the total transactions that respectively trace each of the execution paths.

For example, in the context of FIGS. 1-3, the orchestrator 102 may perform trace distribution time series generation 226 (e.g., in an application signature block 210) in order to calculate a trace distribution time series associated with the one(s) of the execution paths 310a-310g of the one of the services 320a-320o. The trace distribution time series may be a distribution of execution paths that are traced over a set of time periods $P_1, P_2, \ldots, P_n$.

At 608, the computing system may calculate a trace distribution associated with the execution path(s) of the instruction set. For example, the trace distribution may be calculated to forecast traces over the execution path(s) of the instruction set in another time period (e.g., time period $P_{n+1}$). In some aspects, the computing system may calculate the number of transactions issued for execution path(s) of the instruction set over a time period $P_m$. The computing system may then calculate the trace distribution associated with the execution paths of the instruction set as the quotient of the number of transactions tracing the execution path(s) associated with the instruction set divided by the total number of transactions tracing every execution path associated with the application over the time period $P_m$.

In some other aspects, the computing system may forecast a trace distribution for another time period based on previously observed trace distribution numbers. For example, the computing system may forecast a trace distribution for the current time period or the next consecutive time period (e.g., time period $P_{n+1}$) based on a sequence of preceding time periods (e.g., time periods $P_1, P_2, \ldots, P_n$). The computing system may forecast the trace distribution according to the relative frequency with which each execution path is traced over one or more preceding time periods (e.g., time periods $P_1, P_2, \ldots, P_n$).

In some examples, for each execution path, the computing system may count a respective number of transactions in each of the one or more preceding time periods that trace the execution path. Further, the computing system may count the total number of transactions in each of the one or more preceding time periods—e.g., the computing system may count the number of every transaction in each of the one or more time periods that traces an execution path of any service that composes the application. For each execution path, the computing system may calculate the fractional amount of the total number of transactions in each of the one or more time periods that trace the execution path. The computing system may then forecast the trace distribution in another time period (e.g., the current time period or the next consecutive time period) by fitting the calculated fractional amounts onto a time series forecasting model.

For example, in the context of FIGS. 1-3, the application signature block 210 of the orchestrator 102 may perform trace distribution forecasting 228 in order to calculate a trace distribution associated with the respective execution path(s) 310*a*-310*g* of the one of the services 320*a*-320*o* in another time period.

At 610, the computing system may record a signature for the instruction set based on the trace distribution time series. For example, the computing system may assign a respective unique identifier to each of the execution paths. If no signature exists for the instruction set, the computing system may generate an instance or object of a service signature type or class with at least one value of at least one field or property including at least one value uniquely identifying the instruction set. The computing system may configure a respective field or property of the instruction set instance or object of the service signature type or class to indicate the unique identifier of each execution path identified for the instruction set. In addition, the computing system may configure a respective field or property of the instruction set instance or object to indicate the trace distribution time series of each of the uniquely identified execution paths. The computing system may further configure a field or property of the instruction set instance or object to indicate the total number of transactions issued over all time intervals of the time series.

For example, in the context of FIGS. 1-4, the application signature block 210 of the orchestrator 102 may record a signature 420 for the one of the services 320*a*-320*o* based on the trace distribution time series generation 226.

At 612, the computing system may assign a score to the instruction set based on the trace distribution associated with the execution path of the instruction set. For example, the computing system may calculate a respective criticality score for the instruction set using the signature of the instruction set, which may be include information indicating the trace distribution time series associated with the instruction set. The computing system may store the score in memory with information indicating an association with the instruction set.

The score may represent (e.g., estimate, approximate, etc.) the relative effect on or importance of the instruction set in providing or maintaining seamless, robust, user-friendly, and/or otherwise acceptable functionality of the comprehensive application, for example, in the context (e.g., business context) relevant to the application functionality. As described, supra, for example, the computing system may evaluate a score associated with execution of the instruction set included in the application composition upon detecting an event triggered by the execution of the instruction set for the application.

Illustratively, the computing system may detect a notification event triggered during execution of the instruction set for the application, and the computing system may evaluate the criticality score assigned to that instruction set in order to determine a suitable manner in which to handle or process the notification event, e.g., in the context relevant to the application. For example, the computing system may compare the criticality score to a threshold. If the computing system determines that the criticality score satisfies (e.g., meets or exceeds) the threshold, then the computing system may determine that the notification event relates to an instruction set that is relatively more important to the application functionality, and therefore, should be output (e.g., displayed) on a device at the computing system (e.g., an orchestrator), at a client device (e.g., an end-user device), and/or at another device.

According to some aspects of the present disclosure, the computing system may assign the score to the instruction set based on the number of execution paths that include the instruction set, the total number of execution paths for all instruction sets of the application, and the forecasted trace distributions across the execution paths of the instruction set. The computing system may assign the score to the instruction set according to following equation:

$$\text{Score} = \left(\frac{\text{Paths}_{instruction\ set}}{\text{Paths}_{application}}\right) \sum_{i=1}^{Paths_{instruction\ set}} \text{forecasted trace distribution}_i,$$

In the above equation, $\text{Paths}_{instruction\ set}$ may be equal to the number of execution paths of the instruction set to which the score is being assigned, and $\text{Paths}_{application}$ may be equal to the total number of execution paths of all instruction sets that compose the application. Further, forecasted trace distribution; may be the trace distribution forecasted for the $i^{th}$ execution path of the instruction set—that is, each of the forecasted trace distribution numbers calculated for a respective execution path of the instruction set may be summed together and multiplied with the quotient of the number of execution paths on which the instruction set is executed divided by the total number execution paths on which any instruction set composing the application is executed. Of course, if the instruction set is executed via a single execution path for the application, then the number of execution paths of the instruction set will be equal to one and the criticality score will be based on one forecasted trace distribution.

For example, in the context of FIGS. 1-4, the orchestrator 102 may assign a score to the one of the services 320*a*-320*o* based on the trace distribution associated with the execution path(s) 310*a*-310*g* of the service. Illustratively, the criticality calculator block 212 may perform service criticality score calculation 230 in order to assign a score to the API Gateway Service 320*a* using the signature 442 of the API Gateway Service 320*a*.

At 614, the computing system may sort the instruction set into one of a plurality of groups associated with a range that includes the score assigned to the instruction set. For example, the computing system may compare the score to an upper bound and a lower bound delineating a range of a group, and the computing system may assign the instruction set to the group when the score of the instruction set is within (e.g., greater than the lower bound and less than or equal to the upper bound) the range defined by the upper bound and the lower bound of the group. In another example, the computing system may quantize the score in order to assign the instruction set to a group. Accordingly, the computing system may associate the instruction set with a group of other instruction sets having events that are to be treated similarly to those of the instruction set—e.g., the instruction set may be grouped with other instruction sets having similar scores or priorities so that those instruction sets of the group may be similarly handled.

For example, in the context of FIGS. 1-3, the orchestrator 102 may sort one of the services 320*a*-320*o* into one of a plurality of groups associated with a range that includes the score assigned to the service. Illustratively, the recommendation block 214 may perform criticality score-based clustering 232 in order to assign a service (e.g., the API Gateway Service 320*a*) to a cluster of other ones of the services 320*a*-320*o* having similar scores.

At 616, the computing system may reassign another score to the instruction set. For example, as the frequency with which each instruction set is executed changes over time, e.g., due to user demographics and/or other time-variant factors, the computing system may reevaluate the relative criticality of some or all instruction sets. In some aspects, the computing system may periodically calculate another trace distribution time series based on another number of traces on execution paths of the instruction set and another number of traces on all execution paths of instruction sets of the application. The computing system may then calculate (e.g., forecast, predict, etc.) a trace distribution associated with execution path(s) of the instruction set, and the computing system may recalculate the score to be assigned to the instruction set.

For example, in the context of FIGS. 1-3, the orchestrator 102 may reassign a score to the one of the services 320*a*-320*o* based on another trace distribution associated with the execution path(s) 310*a*-310*g* of the service (e.g., at another time). Illustratively, the criticality calculator block 212 may perform service criticality score calculation 230 in order to reassign a score to the API Gateway Service 320*a*.

At 618, the computing system may adjust ranges respectively corresponding to the plurality of groups. For example, the computing system may determine that different instruction sets are executed with different frequencies at different times, and the computing system may adjust one or more upper bounds and/or one or more lower bounds delineating one or more ranges of one or more groups. In some aspects, the computing system may increase or decrease one or more ranges, e.g., in order to prevent all or a majority of the instruction sets from being sorted into the same group.

For example, in the context of FIGS. 1-3, the orchestrator 102 may adjust ranges respectively corresponding to a plurality of groups into which the services 320*a*-320*o* may be sorted according to their respectively assigned scores. Illustratively, the recommendation block 214 may adjust ranges respectively corresponding to the plurality of groups in association with criticality score-based clustering 232.

At 620, the computing system may resort the instruction set into another one of the plurality of groups based on the adjustment of the ranges. For example, the computing system may compare the score currently assigned to the instruction set with the upper bound and/or lower bound defining at least one range for at least one group, and the computing system may assign the instruction set to the group associated with a range that includes the currently assigned score of the instruction set. Potentially, the group to which the instruction set is assigned may be different from another group to which the instruction set had been previously assigned.

For example, in the context of FIGS. 1-3, the orchestrator 102 may resort the instruction set into another one of the plurality of groups based on the adjustment of the ranges. Illustratively, the recommendation block 214 may perform criticality score-based clustering 232 in order to reassign a service (e.g., the API Gateway Service 320*a*) to a cluster of other ones of the services 320*a*-320*o* having similar scores.

At 622, the computing system may control handling of an event associated with an execution of the instruction set based on the score. In order to provide application functionality, the instruction set may be executed and, potentially, the execution of the instruction set may trigger an event. By way of illustration and not limitation, the event may include at least one of a notification configured to be output, an entry configured to be written to a log, an error or exception report, or an interrupt configured to pause the application for which the instruction set is executed. The computing system may be configured to receive (e.g., catch, intercept, etc.) the event, and the computing system may handle the event based on the score associated with the instruction set for which the event was triggered.

In some aspects, the computing system may be configured to suppress some events triggered for some instruction sets of a criticality or priority that is relatively lower than that of other instruction sets. For example, if the event is a notification configured to be presented or output on a device, the computing system may prevent the notification from being output if the score assigned to the instruction set that triggered the event fails to satisfy a threshold. However, if the score satisfies the threshold, then the computing system may refrain from taking any actions affecting the event, and the event may be conventionally handled by the computing system. In some further aspects, the computing system may increase the visibility of the event if the event is triggered by an instruction set having a score that is relatively higher than that of other instruction sets.

In some aspects, the computing system may control handling of the event according to the group to which the instruction set is assigned. For example, if the computing system sorts the instruction set into a group associated with a relatively lower level of criticality, then the computing system may suppress events triggered by execution of the instruction set. However, if the computing system sorts the instruction set into a group associated with a relatively higher level of criticality, then the computing system may refrain from suppressing events triggered by execution of the instruction set.

For example, in the context of FIGS. 1-3, the orchestrator 102 may control handling of an event associated with an execution of one of the services 320*a*-320*o* based on the score respectively assigned to the service. Illustratively, the event handling block 216 may perform criticality score-based event handling 234, e.g., in order to allow the event (if the score assigned to the one of the services 320*a*-320*o* is relatively higher) or suppress the event (if the score assigned to the service is relatively lower).

Figure 7:
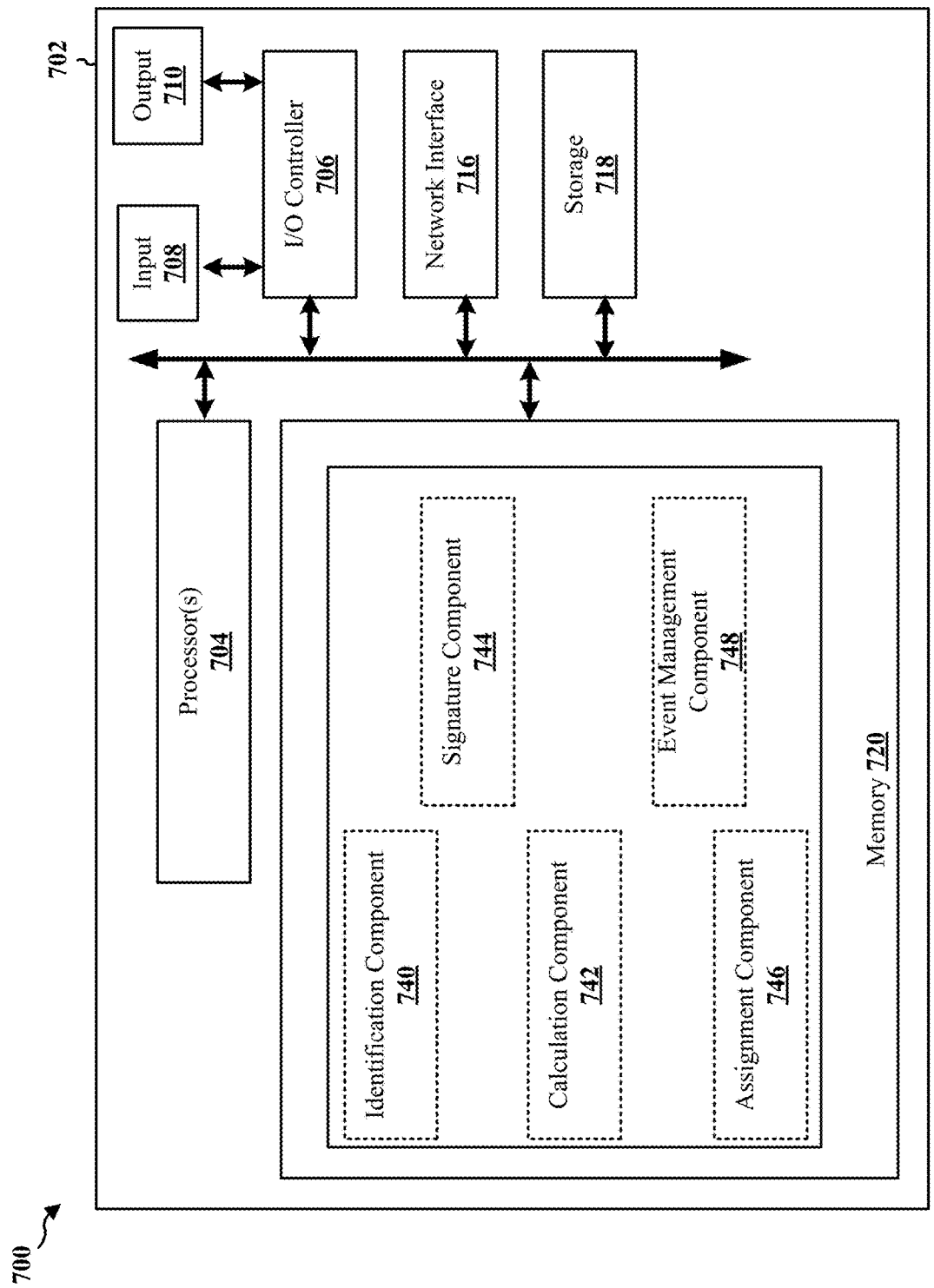
FIG. 7 is a diagram illustrating an example of a hardware implementation for an example apparatus.

FIG. 7 is a diagram 700 illustrating an example of a hardware implementation for an apparatus 702. The apparatus 702 may be a computing system or similar device(s), or the apparatus 702 may be a component of a computing system or similar device(s). The apparatus 702 may include a processor(s) 704 and a memory 720, which may be coupled together and/or integrated into the same package, component, circuit, chip, and/or other circuitry. The processor(s) 704 may include, for example, a CPU, GPU, application processor, SoC, microprocessor, and/or other processor(s). The memory 720 may include, for example, RAM, ROM, and/or other memory configured to store computer-executable instructions. The processor(s) 704 and memory 720 may be configured to perform various aspects described in connection with controlling handling (190) described in connection with FIG. 1.

The apparatus 702 may further include an I/O controller 706, a network interface 716, and storage 718. The I/O controller 706 may be coupled to an input 708, which may include one or more input devices, such as a keyboard, mouse, touchscreen, a microphone, and the like. The I/O controller 706 may be further coupled to an output 710, which may include one or more output devices, such as a display, a speaker, a haptic feedback device, and the like. The network interface 716 may connect the apparatus 702 with one or more other computing systems over at least one network, which may be wired or wireless. For example, the network interface 716 may enable a connection to the Internet, a local area network (LAN), a wide area network (WAN), a personal area network (PAN), an enterprise network, and/or one or more other networks. The storage 718 may include volatile and/or non-volatile storage or memory, such as RAM, ROM, EEPROM, optical disk storage, magnetic disk storage, other magnetic storage devices, combinations of the aforementioned types of computer-readable media, or any other medium that can be used to store computer-executable code in the form of instructions or data structures that can be accessed by a computer.

The processor(s) 704, with the memory 720, may be responsible for general processing, including the execution of instructions stored in the memory 720 (e.g., a non-transitory computer-readable medium/memory). The instructions, when executed by the processor(s) 704, may cause the processor(s) 704 to perform various functions described supra. The memory 720 may also be used for storing data that is manipulated by the processor(s) 704 when executing instructions.

The processor(s) 704 may execute instructions of an identification component 740, calculation component 742, signature component 744, assignment component 746, and/or event management component 748, which may be fetched into memory 720 for execution by the processor(s) 704.

The identification component 740 may be configured to an execution path of an instruction set (e.g., a service) based on a set of dependencies associated with the instruction set, e.g., as described in connection with 602 of FIG. 6. The identification component 740 may be further configured to identify one or more other execution paths of the instruction set based on one or more other sets of dependencies associated with the instruction set, e.g., as described in connection with 604 of FIG. 6.

The calculation component 742 may be configured to calculate a trace distribution time series based on traces on each execution path of the instruction set and traces on all execution paths of instruction sets of an application at each interval of the time series, e.g., as described in connection with 606 of FIG. 6. The calculation component 742 may be further configured to calculate a trace distribution associated with the execution path(s) of the instruction set, e.g., as described in connection with 608 of FIG. 6.

The signature component 744 may be configured to record a signature for the instruction set based on the time series of the trace distribution, e.g., as described in connection with 610 of FIG. 6.

The assignment component 746 may be configured to assign a score to the instruction set based on the trace distribution associated with the execution path of the instruction set, e.g., as described in connection with 612 of FIG. 6. The assignment component 746 may be further configured to sort the instruction set into one of a plurality of groups associated with a range that includes the score assigned to the instruction set, e.g., as described in connection with 614 of FIG. 6. The assignment component 746 may be further configured to reassign another score to the instruction set, e.g., as described in connection with 616 of FIG. 6. The assignment component 746 may be further configured to adjust ranges respectively corresponding to the plurality of groups, e.g., as described in connection with 618 of FIG. 6. The assignment component 746 may be further configured to resort the instruction set into another one of the plurality of groups based on the adjustment of the ranges, e.g., as described in connection with 620 of FIG. 6.

The event handling component 748 may be configured to control handling of an event associated with an execution of the instruction set based on the score, e.g., as described in connection with 622 of FIG. 6.

The apparatus 702 may include additional components that perform some or all of the blocks, operations, signaling, etc. of the algorithm(s) in the aforementioned flowcharts of FIGS. 5A, 5B, and 6. As such, some or all of the blocks, operations, signaling, etc. in the aforementioned flowcharts of FIGS. 5A, 5B, and 6 may be performed by one or more components and the apparatus 702 may include one or more such components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the processor(s) 704 and memory 720, includes means for calculating a trace distribution associated with an execution path of an instruction set; means for assigning a score to the instruction set based on the trace distribution associated with the execution path of the instruction set; and means for controlling handling of an event associated with an execution of the instruction set based on the score.

In one configuration, the apparatus 702, and in particular the processor(s) 704 and memory 720, may further include means for identifying the execution path of the instruction set based on a set of dependencies associated with the instruction set.

In one configuration, each of the set of dependencies comprises a respective other instruction set, and wherein the execution of the instruction set is dependent upon an execution of each of the other instruction sets.

In one configuration, the trace distribution comprises a number of transactions that trace the execution path of the instruction set within a time period.

In one configuration, the apparatus 702, and in particular the processor(s) 704 and memory 720, may further include means for recording a signature for the instruction set based on a trace distribution time series, and the score is assigned based on the signature.

In one configuration, the apparatus 702, and in particular the processor(s) 704 and memory 720, may further include means for identifying one or more other execution paths of the instruction set based on one or more other sets of dependencies associated with the instruction set, and the trace distribution time series is further associated with the one or more other execution paths.

In one configuration, the apparatus 702, and in particular the processor(s) 704 and memory 720, may further include means for calculating the trace distribution time series based on a number of traces on the execution path of the instruction set and a number of traces on a plurality of execution paths of a plurality of instruction sets at each interval of the time series.

In one configuration, the means for controlling handling of the event associated with the execution of the instruction set based on the score is configured to suppress the event based on the score.

In one configuration, the event comprises at least one of a notification configured to be output, an entry configured to be written to a log, an error or exception report, or an interrupt configured to pause an application for which the instruction set is executed.

In one configuration, the apparatus 702, and in particular the processor(s) 704 and memory 720, may further include means for reassigning another score to the instruction set.

In one configuration, the apparatus 702, and in particular the processor(s) 704 and memory 720, may further include means for sorting the instruction set into one of a plurality of groups associated with a range that includes the score assigned to the instruction set, and the handling of the event is controlled based on the one of the plurality of groups.

In one configuration, the apparatus 702, and in particular the processor(s) 704 and memory 720, may further include means for adjusting ranges respectively corresponding to the plurality of groups; and means for resorting the instruction set into another one of the plurality of groups based on the adjustment of the ranges.

In one configuration, the handling of the event is controlled based on the resorted instruction set.

The aforementioned means may be one or more of the aforementioned components of the apparatus 702 configured to perform the functions recited by the aforementioned means.

The previous description is provided to enable any person of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include communication and/or memory operations/procedures through which information or value(s) are acquired, such as "receiving" (e.g., receiving information), "accessing" (e.g., accessing data in a memory), "detecting," and the like.

As another example, reference to an element in the singular is not intended to mean "one and only one" unless specifically stated, but rather "one or more." Further, terms such as "if," "when," and "while" should be interpreted to mean "under the condition that" rather than imply an immediate temporal relationship or reaction. That is, these phrases, e.g., "when," do not imply an immediate action in response to or during the occurrence of an action or event, but rather imply that if a condition is met then another action or event will occur, but without requiring a specific or immediate time constraint or direct correlation for the other action or event to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A computing system, comprising:
    at least one memory; and
    at least one processor coupled to the at least one memory and configured to:
        calculate a trace distribution associated with an execution path of an instruction set;
        record a signature for the instruction set based on a trace distribution time series;
        assign a score to the instruction set based on the trace distribution associated with the execution path of the instruction set and the signature; and
        control handling of an event associated with an execution of the instruction set based on the score.

2. The computing system of claim 1, wherein the at least one processor is further configured to:
    identify the execution path of the instruction set based on a set of dependencies associated with the instruction set.

3. The computing system of claim 2, wherein each of the set of dependencies comprises a respective other instruction set, and wherein the execution of the instruction set is dependent upon an execution of each of the other instruction sets.

4. The computing system of claim 1, wherein the trace distribution comprises a number of transactions that trace the execution path of the instruction set within a time period.

5. The computing system of claim 1, wherein the at least one processor is further configured to:
identify one or more other execution paths of the instruction set based on one or more other sets of dependencies associated with the instruction set,
wherein the trace distribution time series is further associated with the one or more other execution paths.

6. The computing system of claim 1, wherein the at least one processor is further configured to:
calculate the trace distribution time series based on a number of traces on the execution path of the instruction set and a number of traces on a plurality of execution paths of a plurality of instruction sets at each interval of the time series.

7. The computing system of claim 1, wherein to control handling of the event associated with the execution of the instruction set based on the score comprises to:
suppress the event based on the score.

8. The computing system of claim 7, wherein the event comprises at least one of a notification configured to be output, an entry configured to be written to a log, an error or exception report, or an interrupt configured to pause an application for which the instruction set is executed.

9. The computing system of claim 1, wherein the at least one processor is further configured to:
reassign another score to the instruction set.

10. The computing system of claim 1, wherein the at least one processor is further configured to:
sort the instruction set into one of a plurality of groups associated with a range that includes the score assigned to the instruction set,
wherein the handling of the event is controlled based on the one of the plurality of groups.

11. The computing system of claim 10, wherein the at least one processor is further configured to:
adjust ranges respectively corresponding to the plurality of groups; and
resort the instruction set into another one of the plurality of groups based on the adjustment of the ranges.

12. The computing system of claim 11, wherein the handling of the event is controlled based on the resorted instruction set.

13. A computing device, comprising:
at least one memory; and
at least one processor coupled to the at least one memory and configured to:
evaluate a set of traces associated with executions of a plurality of instruction sets;
identify a set of execution paths associated with the plurality of instruction sets;
determine a criticality factor associated with each of the plurality of instruction sets based on a trace distribution forecasted from the set of traces and the set of execution paths; and
process an event triggered according to one of the plurality of instruction sets based on the criticality factor of the one of the plurality of instruction sets.

14. The computing device of claim 13, wherein to process the event triggered according to the one of the plurality of instruction sets, the at least one processor is further configured to:
prevent output of the event when the criticality factor associated with the one of the plurality of instruction sets fails to satisfy a threshold, or
output the event when the criticality factor associated with the one of the plurality of instruction sets satisfies the threshold.

15. The computing device of claim 13, wherein the at least one processor is further configured to:
calculate a trace distribution time series based on subsets of the set of traces respectively corresponding to time intervals of the trace distribution time series; and
determine a signature associated with the one of the plurality of instruction sets based on the set of execution paths associated with the one of the plurality of instruction sets and the trace distribution time series,
wherein the trace distribution is forecasted based on the signature.

16. The computing device of claim 13, wherein the trace distribution forecasted from the set of traces and the set of execution paths comprises a trace distribution that is based on a subset of the set of traces corresponding to a single time period.

17. A method of operating a computing system, comprising:
calculating a trace distribution associated with an execution path of an instruction set;
recording a signature for the instruction set based on a time series of the trace distribution,
assigning a score to the instruction set based on the trace distribution associated with the execution path of the instruction set and the signature; and
controlling handling of an event associated with an execution of the instruction set based on the score.

18. The method of claim 17, further comprising:
calculating the time series of the trace distribution based on a number of traces on each execution path of the instruction set and a number of traces on all execution paths of a plurality of instruction sets at each interval of the time series.

* * * * *